United States Patent
Doerring et al.

(10) Patent No.: US 9,858,337 B2
(45) Date of Patent: *Jan. 2, 2018

(54) MANAGEMENT, CATEGORIZATION, CONTEXTUALIZING AND SHARING OF METADATA-BASED CONTENT FOR MEDIA

(71) Applicant: OpenTV, Inc., San Francisco, CA (US)

(72) Inventors: Nicholas Daniel Doerring, San Francisco, CA (US); John Michael Teixeira, Oakland, CA (US); Claes Georg Andersson, Berkeley, CA (US); Steven J. Szymanski, San Jose, CA (US); Kevin Staunton-Lambert, Pyrmont (AU)

(73) Assignee: OPENTV, INC., San Francisco, CA (US)

(*) Notice: Subject to any disclaimer, the term of this patent is extended or adjusted under 35 U.S.C. 154(b) by 419 days.

This patent is subject to a terminal disclaimer.

(21) Appl. No.: 14/588,143

(22) Filed: Dec. 31, 2014

(65) Prior Publication Data

US 2016/0188709 A1 Jun. 30, 2016

(51) Int. Cl.
G06F 17/30 (2006.01)

(52) U.S. Cl.
CPC .. *G06F 17/30705* (2013.01); *G06F 17/30053* (2013.01); *G06F 17/30058* (2013.01); *G06F 17/3082* (2013.01); *G06F 17/30787* (2013.01); *G06F 17/30817* (2013.01)

(58) Field of Classification Search
USPC ..................... 707/705, 740, 758
See application file for complete search history.

(56) References Cited

U.S. PATENT DOCUMENTS

| | | | |
|---|---|---|---|
| 6,674,448 B1 | 1/2004 | Garahi et al. | |
| 7,356,830 B1 | 4/2008 | Dimitrova | |
| 8,953,836 B1 | 2/2015 | Postelnicu et al. | |
| 2003/0093790 A1 | 5/2003 | Logan et al. | |
| 2005/0044561 A1 | 2/2005 | McDonald | |
| 2007/0130472 A1 | 6/2007 | Buer et al. | |
| 2008/0208851 A1* | 8/2008 | Briggs | H04H 20/14 |
| 2008/0313541 A1 | 12/2008 | Shafton et al. | |
| 2009/0154806 A1 | 6/2009 | Chang et al. | |
| 2010/0104184 A1 | 4/2010 | Bronstein et al. | |
| 2010/0115003 A1 | 5/2010 | Soules et al. | |
| 2010/0125875 A1 | 5/2010 | Hays et al. | |
| 2010/0169303 A1* | 7/2010 | Biderman | H04N 7/17318 707/723 |
| 2010/0275224 A1 | 10/2010 | Sheng et al. | |
| 2011/0222787 A1 | 9/2011 | Thiemert et al. | |
| 2011/0246621 A1* | 10/2011 | May, Jr. | H04N 7/17318 709/219 |

(Continued)

OTHER PUBLICATIONS

European Patent Office, Extended European Search Report, European Patent Application 15199699.8, dated Mar. 21, 2016, 13 pages.

(Continued)

*Primary Examiner* — Hanh Thai
(74) *Attorney, Agent, or Firm* — Procopio, Cory, Hargreaves & Savitch LLP

(57) ABSTRACT

A computer system for identifying and associating metadata across related media with the same content.

20 Claims, 18 Drawing Sheets

(56) References Cited

U.S. PATENT DOCUMENTS

| | | | |
|---|---|---|---|
| 2011/0246622 A1* | 10/2011 | Pantos | H04L 65/1083 709/219 |
| 2011/0252118 A1* | 10/2011 | Pantos | G06F 17/30053 709/219 |
| 2012/0135804 A1 | 5/2012 | Bender et al. | |
| 2012/0189212 A1 | 7/2012 | Ren et al. | |
| 2012/0254917 A1* | 10/2012 | Burkitt | G06F 17/30817 725/40 |
| 2012/0311094 A1* | 12/2012 | Biderman | H04N 5/783 709/219 |
| 2013/0111514 A1 | 5/2013 | Slavin et al. | |
| 2013/0139209 A1 | 5/2013 | Urrabazo et al. | |
| 2013/0268533 A1 | 10/2013 | Komarov | |
| 2013/0343598 A1 | 12/2013 | Kocks et al. | |
| 2014/0098293 A1 | 4/2014 | Ishtiaq et al. | |
| 2014/0280035 A1 | 9/2014 | Fraser et al. | |
| 2014/0349750 A1 | 11/2014 | Thompson et al. | |
| 2015/0088890 A1* | 3/2015 | Hoffert | G06F 17/3002 707/737 |
| 2015/0089075 A1* | 3/2015 | Strigeus | G06F 17/30321 709/231 |
| 2015/0256600 A1* | 9/2015 | Dakhane | H04L 67/10 709/203 |
| 2015/0319470 A1 | 11/2015 | Tang et al. | |

OTHER PUBLICATIONS

Oostveen et al., Feature Extraction and a Database Strategy for Video Fingerprinting, Security in Communications Networks: Third International Conference, Revised Papers/SCN 2002, Amalfi, Italy, Sep. 11-13, 2002, LNCS, Springer Verlag, DE, 2314, Mar. 11, 2002, pp. 117-128.

International Search Report and Written Opinion dated Mar. 15, 2016 for PCT App No. PCT/US2015/064541, 11 pgs.

* cited by examiner

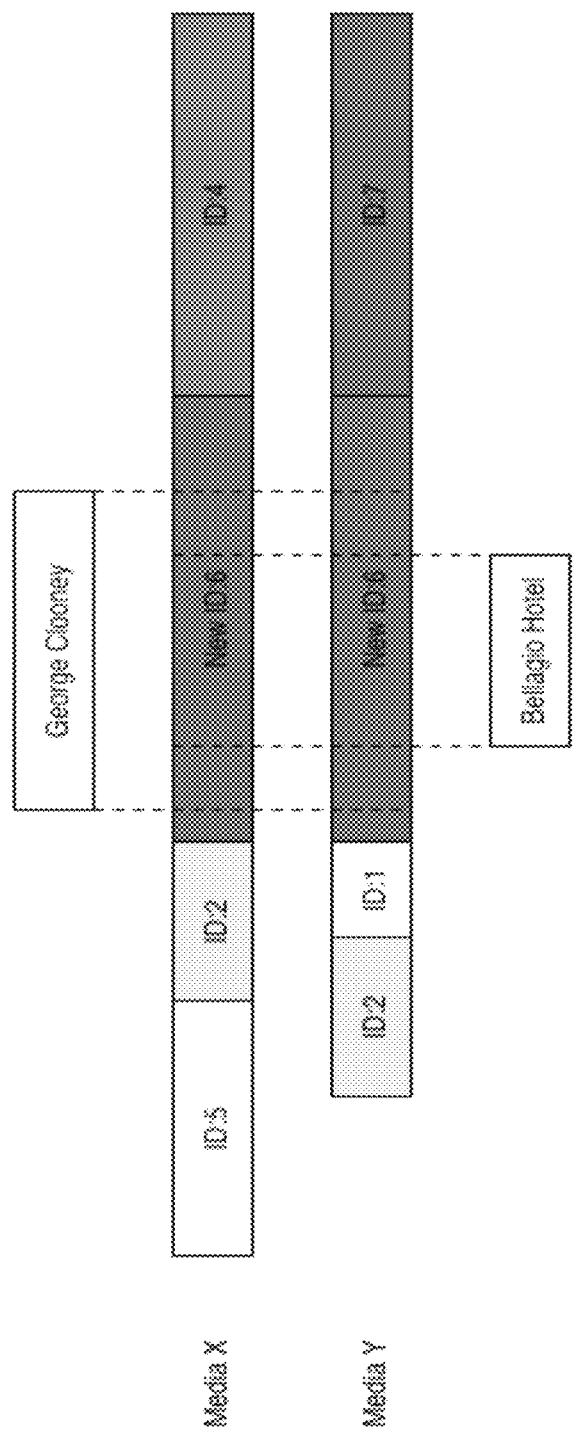

MANAGEMENT, CATEGORIZATION, CONTEXTUALIZING AND SHARING OF METADATA-BASED CONTENT FOR MEDIA

CROSS REFERENCE TO RELATED APPLICATIONS

This application is related to copending U.S. application Ser. No. 14/587,926, entitled Identifying and Categorizing Contextual Data for Media, filed on Dec. 31, 2014 concurrently herewith by the same Applicant, OpenTV, Inc, the entirety of which is incorporated by reference hereby.

DESCRIPTION OF RELATED TECHNOLOGY

Disclosed are systems and methods related generally to content management, and more particularly to metadata delivery and management in conjunction with media.

Metadata for a given moment in a piece of media can often be common to other media products. As an example, George Clooney might be standing in front of the Bellagio Hotel at 33 minutes into the theatrical release of Ocean's Eleven. In the directors cut, the same scene might show up at 40 minutes into the move. In both cases it might be useful to know that the actor is George Clooney or that he is standing in front of the Bellagio Hotel. This data can relevant and applied to the Unrated Version, European Release, and any other releases of the same movie. For example, some movies have as many as seven different major versions. Movies may also have documentaries that include the same moments. Some forms of media, for example television shows, may have common moments or contexts that extend over hundreds of episodes, for example the opening and closing credits or scene breaks. The variations of contexts and content that can be shared or common between media products are vast.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

Reference will be made to the following Detailed Description, which is to be read in association with the accompanying drawings, wherein:

FIG. 9 illustrates media playlists including shared segments and contexts for metadata in accord with at least one of the various embodiments;

DETAILED DESCRIPTION OF THE EMBODIMENTS

Figure 1:
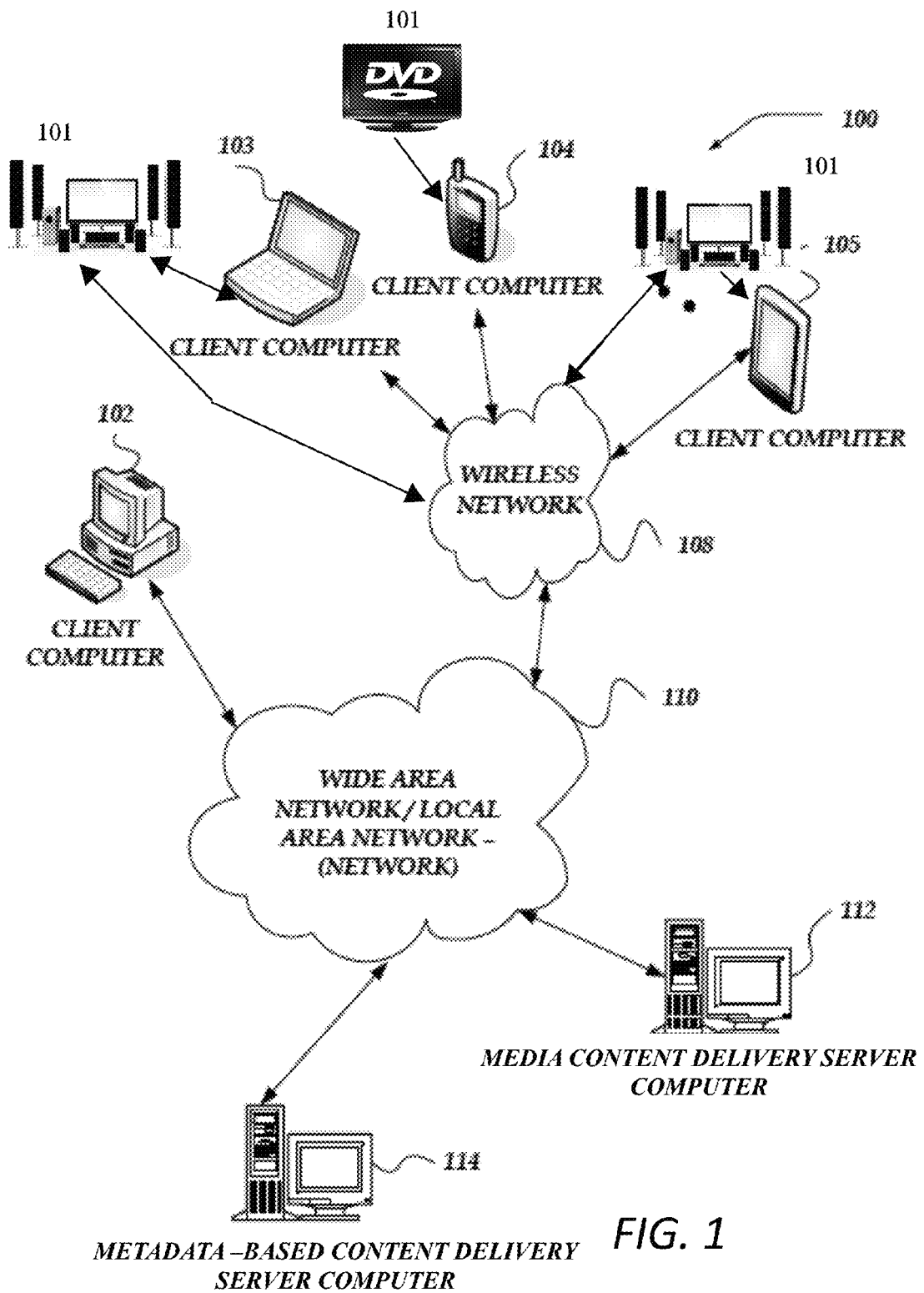
FIG. 1 is a system diagram of an environment in which at least one of the various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a computer system, computerized method, and computer programs for identifying and associating metadata across related media with the same content. The system can comprise one or more processors operative to execute instructions; an operative connection to a plurality of databases comprising: a segment database comprising a plurality of segments, each segment comprising a segment ID corresponding to a segment of a media item; a signature database, the signature database including signatures for identified media; a media playlist database; a metadata database. The computer system, computerized method, and computer programs can comprise non-transitory memory operatively coupled to at least one of the including computer executable instructions; the one or more processors programmed at least to, when the program memory instructions are executed by the processors, a) sample a signature for a new media item;

b) compare the signature sample of the new media item against the signature database to identify at least one segment associated with the signature in common with a matching media item;

c) retrieve a media playlist associated with the one or more previously identified segments for the matching media item from the media playlist database, each media playlist associated with one or more segments and a start time, and an end time corresponding to a each segment of a media item d) assign one or more segment IDs to the common segments associated with the signature in the new media item at a time location in a segment playlist for the new media item;

e) identify a segment within the sample of the new media item;

f) repeat steps b) through d) on the unidentified segment; and g) repeat steps e) and f) until all matching media items and commonly identified segments are identified and assigned to the new media item, and h) save the segment playlist for the new media item as a new media playlist, wherein metadata is associated with each of the one or more segments.

In various embodiments, the computer system, computerized method, and computer programs can further comprise the one or more processors being programmed at least to: after step g), determine that the new media item includes unidentified segments; and assign new segment IDs to the unidentified segments.

In various embodiments, the computer system, computerized method, and computer programs can further comprise the one or more processors being programmed at least to: if the previously identified segment of a matching media item includes signature data that is larger than the common signature data in the new media item, divide the previously identified segment of the matching media item into a plurality of segments including a common segment and at least one new, unidentified segment not including the common signature data.

In various embodiments, the computer system, computerized method, and computer programs can further comprise the one or more processors being programmed at least to: identify one or more media playlists that have one or more segments in common with the previously identified segment that was divided; and update the media playlist to include the divided segments.

In various embodiment the associating metadata can further comprise the one or more processors being programmed at least to augment each segment with one or more distinct context data structures, each distinct context data structure having the same duration as the segment and being configured to contain temporal contextual data for the distinct context, wherein each temporal contextual data has a normalized start time and stop time within the segment; and to add distinct temporal contextual data to the distinct context data structure. The distinct context data structure can include at least one of a video context, an audio context, and a narrative context.

In various embodiments, the computer system, computerized method, and computer programs can identify temporal contextual data that applies over a plurality of segments in a media playlist.

In various embodiments, the computer system, computerized method, and computer program further comprises the one or more processors being programmed at least to identify common segments for a plurality of media items, the plurality of media items being hosted by different content systems; and allow a user to creating a shareable link for one or more of the common segments, the link being configured to allow a plurality of users to access the media item for the one or more common segments on different content systems.

Described are embodiments to, among other advantages, associate metadata to a moment in a piece of media and share it with other media that has the same moment. The variations of contexts and content that can be shared or common and different between media products is vast. Described in various embodiments are systems and methods that can automatically and instantly share vast amounts of temporal metadata with all versions of the media (any media that shares a segment with another piece of media). Various embodiments also allow the system to efficiently store and process vast amounts of media data with smaller data footprints, and thus allow faster processing speeds for media related data.

Illustrative Operating Environment

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs) wide area networks (WANs)—(network) 110, wireless network 108, client computers 102-105, Media Content Delivery Server Computer 112, and Metadata-Based Content Delivery Server Computer 114.

At least one embodiment of client computers 102-105 is described in more detail below in conjunction with FIG. 2. In one embodiment, at least some of client computers 102-105 may operate over a wired and/or wireless network, such as networks 110 and/or 108. Generally, client computers 102-105 may include virtually any computer capable of communicating over a network to send and receive information, perform various online activities, offline actions, or the like. In various embodiments, one or more of client computers 102-105 can be configured to operate with conjunction with a media device or system 101, for example a television, radio, another computer, a tablet device, as smart phone, or any device enabled to allow a user to consume media. For example, a client device 105 can be configured to send data from a user consuming a media product on a media device or system 101, for example a movie, television show, or listening to music from or another source or media device or system 101, e.g.: a television, a radio, a home theater, a sound system, another computer, or even in a movie theater, etc. In various embodiments the media product may be provided to the user locally, for example via DVD, CD, or any locally or physically stored media, etc. and can also be provided by a media content delivery service, such as a streaming media service, which can be provided by the Media Content Delivery Server 112 to the other media device 101 (e.g. a television or another computer). Client computers 102-105 need not of course be constrained to such use and may also be employed, for example, as an end-user computing node, or any other typical use for a computer device.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable personal computer capable of connecting to another computing device and receiving information such as, laptop computer 103, smart mobile telephone 104, and tablet computers 105, and the like. However, portable computers are not so limited and may also include other portable devices such as cellular telephones, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, and the like. In one embodiment, a user of the client computer may employ the browser application to perform various activities over a network (online). However, another application may also be used to perform various online activities.

Client computers 102-105 may also include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Media Content Delivery Server Computer 112, Metadata-Based Content Delivery Server Computer 114, or other computers.

Client computers 102-105 may further be configured to include a client application that enables an end-user to log into an end-user account that may be managed by another computer, such as Metadata-Based Content Delivery Server Computer 114, Media Content Delivery Server Computer 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, LTE, 4G, 5G, and future access networks may enable wide area coverage for mobile devices, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers and/or computing devices, including, Media Content Delivery Server Computer 112, Metadata-Based Delivery Server Computer 114, client computer 102, and client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a Metadata-Based Delivery Server Computer 114 is described in more detail below in conjunctions with FIG. 3. Briefly, however, Metadata-Based Content Delivery Server Computer 114 includes virtually any network computer capable of delivering metadata-based content to a client user and accepting requests and data therefrom. For example, a client device 105 can be configured to send data from a user consuming a media product, for example a movie, television show, or listening to music from or another source or media device, e.g.: a television, a radio, a, movie theater, etc. The Metadata-Based Content Delivery Server Computer 114 can then deliver, inter alia, complementary synchronous metadata-based content based on the identification of the media being consumed by the user. Computers that may be arranged to operate as Metadata-Based Content Delivery Server Computer 114 include various network computers, including, but not limited to multiprocessor systems, server computers, and the like.

Although FIG. 1 illustrates Metadata-Based Delivery Server Computer 114 as a single computer, the invention is not so limited. For example, one or more functions of the Metadata Delivery Server Computer 114 may be distributed across one or more distinct network computers. Moreover, Metadata-Based Delivery Server Computer 114 is not limited to a particular configuration. Thus, in one embodiment, Metadata-Based Delivery Server Computer 114 may contain a plurality of network computers. In another embodiment, Metadata-Based Delivery Server Computer 114 may contain a plurality of network computers that operate using a master/slave approach, where one of the plurality of network computers of Metadata-Based Delivery Server Computer 114 is operative to manage and/or otherwise coordinate operations of the other network computers. In other embodiments, the Metadata-Based Delivery Server Computer 114 may operate as a plurality of network computers arranged in a cluster architecture, a peer-to-peer architecture, and/or even within a cloud architecture. Thus, embodiments are not to be construed as being limited to a single environment, and other configurations, and architectures are also envisaged.

Although illustrated separately, Media Content Delivery Server Computer 112 and Metadata-Based Delivery Server Computer 114 may be employed as a single network computer, separate network computers, a cluster of network computers, or the like. In some embodiments, either Media Content Delivery Server Computer 112 or Metadata-Based Delivery Server Computer 114, or both, may be enabled to deliver content, respond to user interactions with the content, track user interaction with the content, update widgets and widgets controllers, or the like.

Illustrative Client Computer

Figure 2:
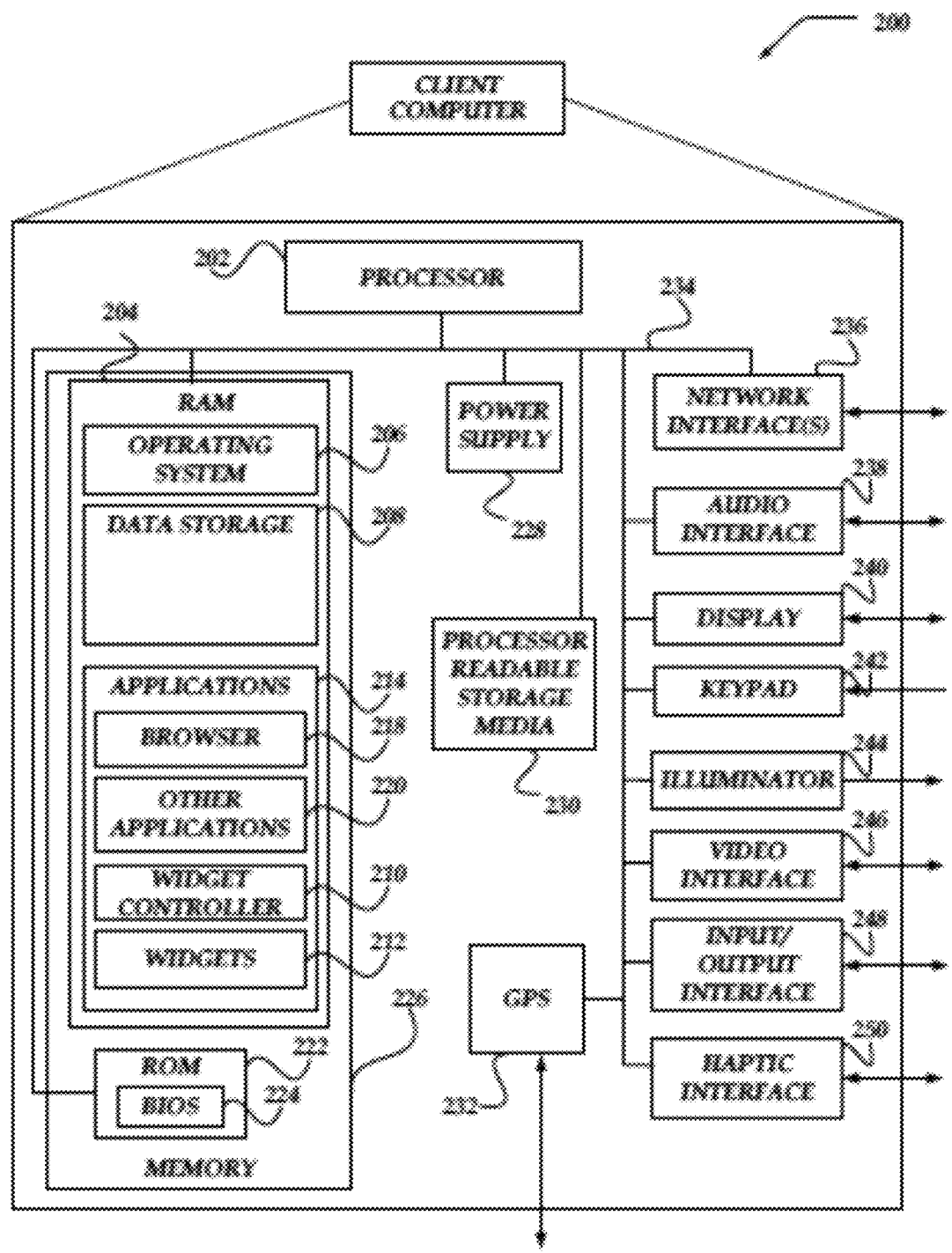
FIG. 2 shows an embodiment of a client computer that may be included in a system such as that shown in FIG. 1.

FIG. 2 shows one embodiment of Client Computer 200 that may be included in a system implementing embodiments of the invention. Client Computer 200 may include many more or less components than those shown in FIG. 2. However, the components shown are sufficient to disclose an illustrative embodiment for practicing the present invention. Client Computer 200 may represent, for example, one embodiment of at least one of Client Computers 102-105 of FIG. 1.

As shown in the figure, Client Computer 200 includes a processor 202 in communication with a mass memory 226 via a bus 234. In some embodiments, processor 202 may include one or more central processing units (CPU). Client Computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232 or other geolocation components.

Power supply 228 provides power to Client Computer 200. A rechargeable or non-rechargeable battery may be used to provide power. The power may also be provided by an external power source, such as an alternating current (AC) adapter or a powered docking cradle that supplements and/or recharges a battery.

Client Computer 200 may optionally communicate with a base station (not shown), or directly with another computer. Network interface 236 includes circuitry for coupling Client Computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of media from another source (e.g., television, radio, etc.). For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the Client Computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computing computer is calling. Accelerometers and other kinetic or force-based interfaces can be included as well.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, HTML, XML, and the like, to display and send a message. However, any of a variety of other web-based programming languages may be employed. In one embodiment, browser 218 may enable a user of client computer 200 to communicate with another network computer, such as Metadata-Based Content Delivery Server Computer 112 and/or Metadata Associations Server Computer 114 of FIG. 1.

Applications 214 may also include Widget Controller 210 and one or more Widgets 212. Widgets 212 may be collections of content provided to the client computer by Metadata Delivery Server Computer 112. Widget Controller 210 may be a program that may be provided to the client computer by Metadata Delivery Server Computer 112. Widget Controller 210 and Widgets 212 may run as native client computer applications or they may run in Browser 218 as web browser based applications. Also, Widget Controller 210 and Widgets 212 may be arranged to run as native applications or web browser applications, or combination thereof.

As used herein, the term "widget controller" refers to a computer program that may be operative on a client application. Widget controllers may be downloaded and/or otherwise deployed to a client application. Widget controllers may be arranged to be operative for downloading content, monitoring media, or otherwise managing widgets located within client applications.

As used herein, the term "widget" refers to a user-interface element located in the client application. Widgets may be invisible or visible to users of the client applications. In some cases, a widget controller may generate widget "on-the-fly" before deploying content into the widget. Widgets may be adapted to reflect the operating environment of the client application that they are being hosted within. For example, in clients that support HTML, CSS a widget may be an HTML element such as a DIV, P, or the like. For client application operative in a Java environment, a widget may be a View object or Window object, and so on.

Illustrative Network Computer

Figure 3:
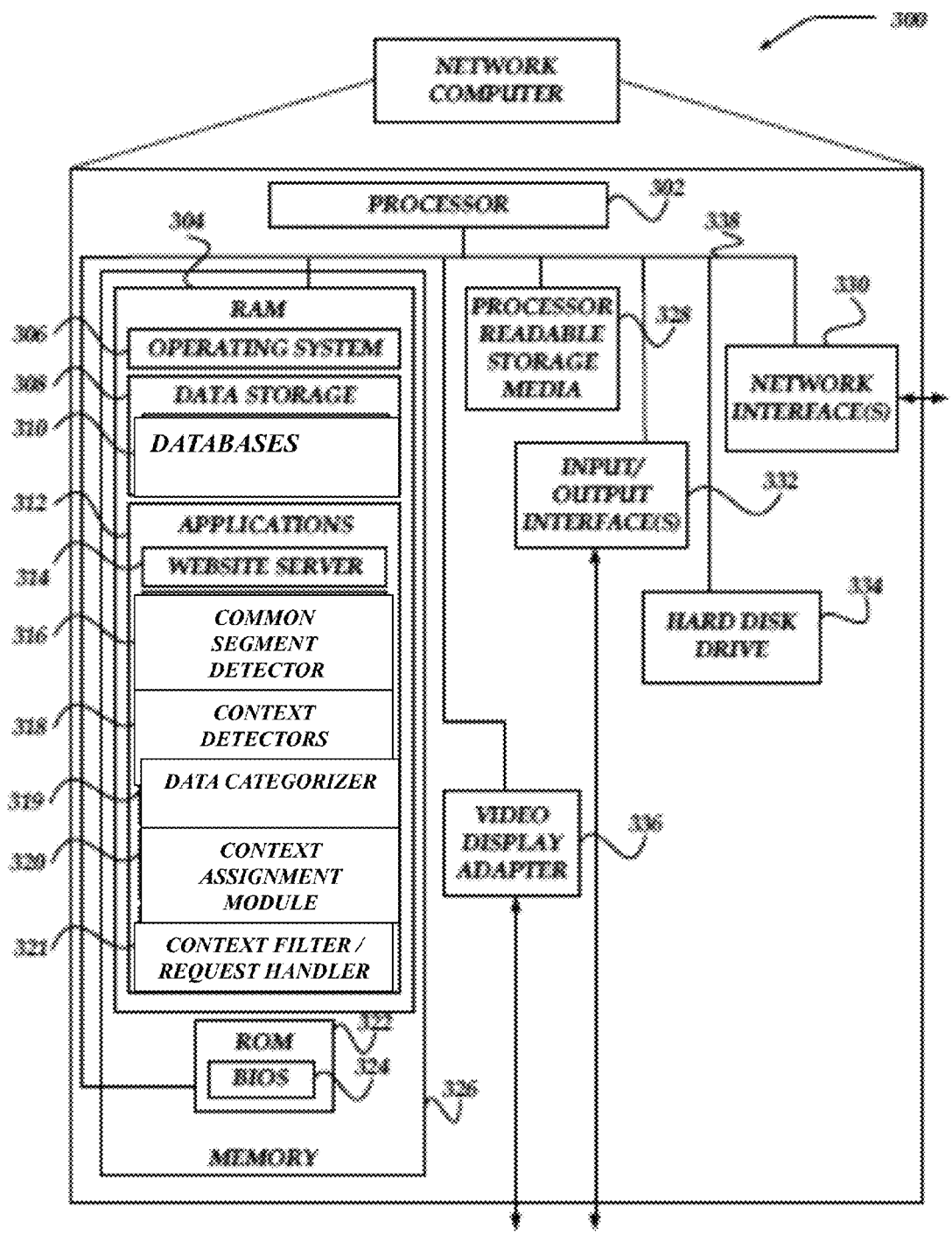
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example Media Content Delivery Server Computer 112 and/or Metadata-Based Delivery Server Computer 114 of FIG. 1, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data such as content 310. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within client computer 300.

Data storage 308 may include a database, text, spreadsheet, folder, file, or the like, that may be configured to maintain and store user account identifiers, user profiles, email addresses, IM addresses, and/or other network addresses; or the like.

Figure 4:
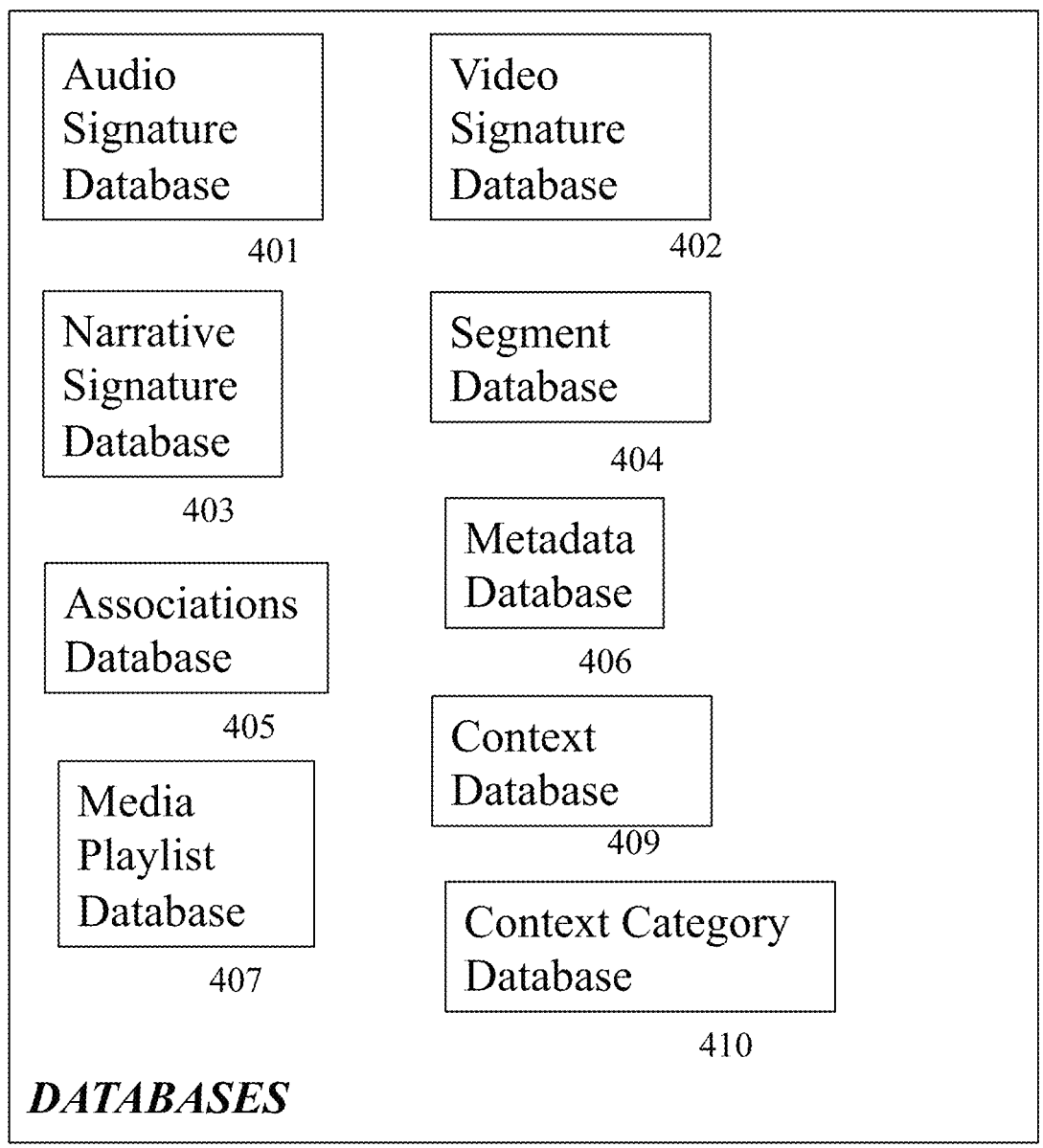
FIG. 4 illustrates a plurality of databases that may be included in a system such as that shown in FIG. 1.

In at least one of the various embodiments, data storage 308 may include databases 310. In various embodiments, as shown in FIG. 4, databases include such as one or more signature databases (e.g. an audio signature database 401, a video signature database 402, a narrative signature database 403), a segment database 404, an associations database 405, a metadata database 406, a media playlist database 407, a context database 409, and a context category database 410. Although the system shows the databases 310 as included in the system and server 300, one or more of the databases can be external to the server or system and operatively connected thereto.

Returning to FIG. 3, data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 312 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include, for example, a website server 314, a Common Segment Detector Application 316, one or more Context Difference Detector Applications 318, a Data Categorizer Application 319, a Context Assignment Module 320, and/or Context Filtering and Request Handler 321.

Website server 314 may represents any of a variety of information and services that are configured to provide content, including messages, over a network to another computer. Thus, website server 314 can include, for example, a web server, a File Transfer Protocol (FTP) server, a database server, a content server, or the like. Website server 314 may provide the content including messages over the network using any of a variety of formats including, but not limited to HTML, XML, Compact HTML (cHTML), Extensible HTML (xHTML), or the like.

In at least one of the various embodiments, Applications 312 may be operative on Metadata-Based Content Delivery Server Computer 114 of FIG. 1. Applications 312 may employ processes, or parts of processes, similar to those described in conjunction with FIGS. 6-15, to perform at least some of its actions.

Illustrative Logical System Architecture

Figure 5:
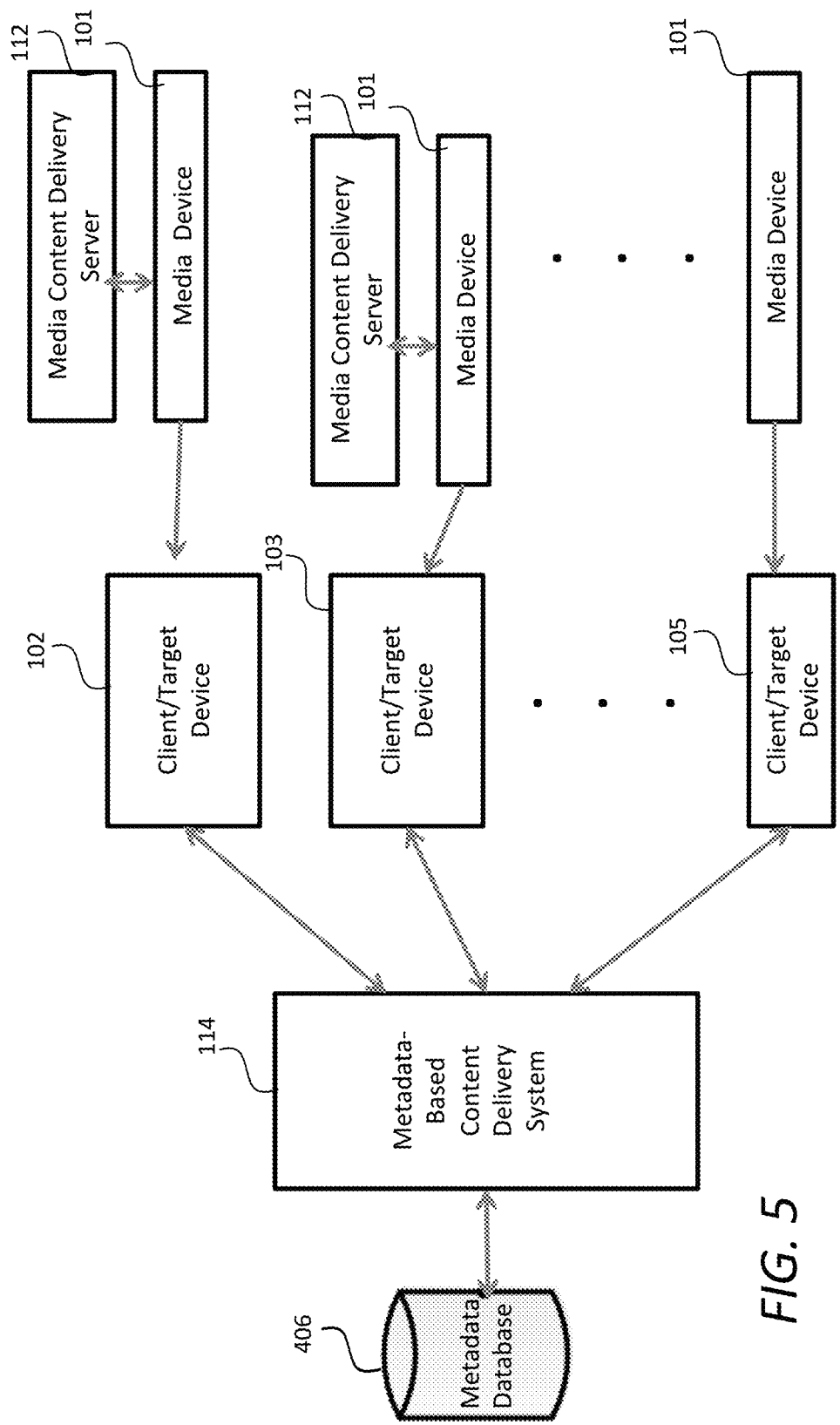
FIG. 5 represents a logical architecture for a system for metadata delivery that may be included in a system such as that shown in FIG. 1

FIG. 5 illustrates a logical architecture of system 100 for various embodiments. In at least one of the various embodiments, content served from and/or hosted on Metadata-Based Delivery Server Computer 114 may be provided over a network to one or more target devices or client computers, such as, client computer 102, client computer 103 client computer 105, client computer, or the like. Exemplary target/client devices can include tablet, a set top box or a BD/DVD player.

Metadata-Based Content Delivery Server Computer 114 includes virtually any network computer capable of delivering metadata content to a client user and accepting requests and data therefrom. For example, a client device 105 can be configured to send data from a user consuming a media product on a media device or system 101, for example a movie, television show, or listening to music from or another source or media device or system 101, e.g.: a television, a radio, a home theater, a sound system, another computer, or even in a movie theater, etc. In various embodiments the media product may be provided to the user locally, for example via DVD, CD, or any locally or physically stored media, etc. and can also be provided by a media content delivery service, such as a streaming media service, which can be provided by the Media Content Delivery Server 112 to the other media device 101 (e.g. a television or another computer). In various embodiments the media product may be provided to the user locally, for example via DVD, CD, or any locally or physically stored media, etc., and can also be provided by a media content delivery service, such as a streaming media service, which can be provided by the Media Content Delivery Server 112 to the other media device or system 101 The client device 105 can receive audio signals from the media product via the audio interface 238 and transmit the data for the media product to the Metadata-Based Content Delivery Server Computer 114 so that the media can be identified via, for example, a signature such as an automated content recognition (ACR) fingerprint. As known in the art, ACR technology allows the system to look up media within a library and the offset into the media that may match an audio or video sample taken from another piece of media. ACR converts the audio or video to an alternate format, referred to as a fingerprint, which can be saved in a database such as an ACR database, and the media item can then be identified without saving the raw data for the media item. Although ACR fingerprints are referred to herein, signatures can include any digital sampling techniques and variants thereof that can be employed create and store information, i.e., a digital signature, to uniquely identify a digital item or digitally represented item such as a media item. The Metadata-Based Content Delivery Server Computer 114 can then deliver, inter alia, complementary synchronous content stored in a metadata database 104 based on the identification of the media being consumed by the user. As noted above with respect to FIG. 4, the metadata database can be external to the Metadata-Based Content Delivery Server Computer 114, though it can be an internal database or a combination of internal and external databases.

One of ordinary skill in the art will appreciate that the architecture of the system is a non-limiting example that is illustrative of at least a portion of at least one of the various embodiments. As such, more or less components may be employed and/or arranged differently without departing from the scope of the innovations described herein.

Generalized Operation

The operation of certain aspects of the invention will now be described with respect to FIGS. 6-15. In at least one of various embodiments, processes described in conjunction with FIGS. 6-15, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 6-15 may be operative in system with logical architectures such as those described in conjunction with FIG. 5.

Figure 6:
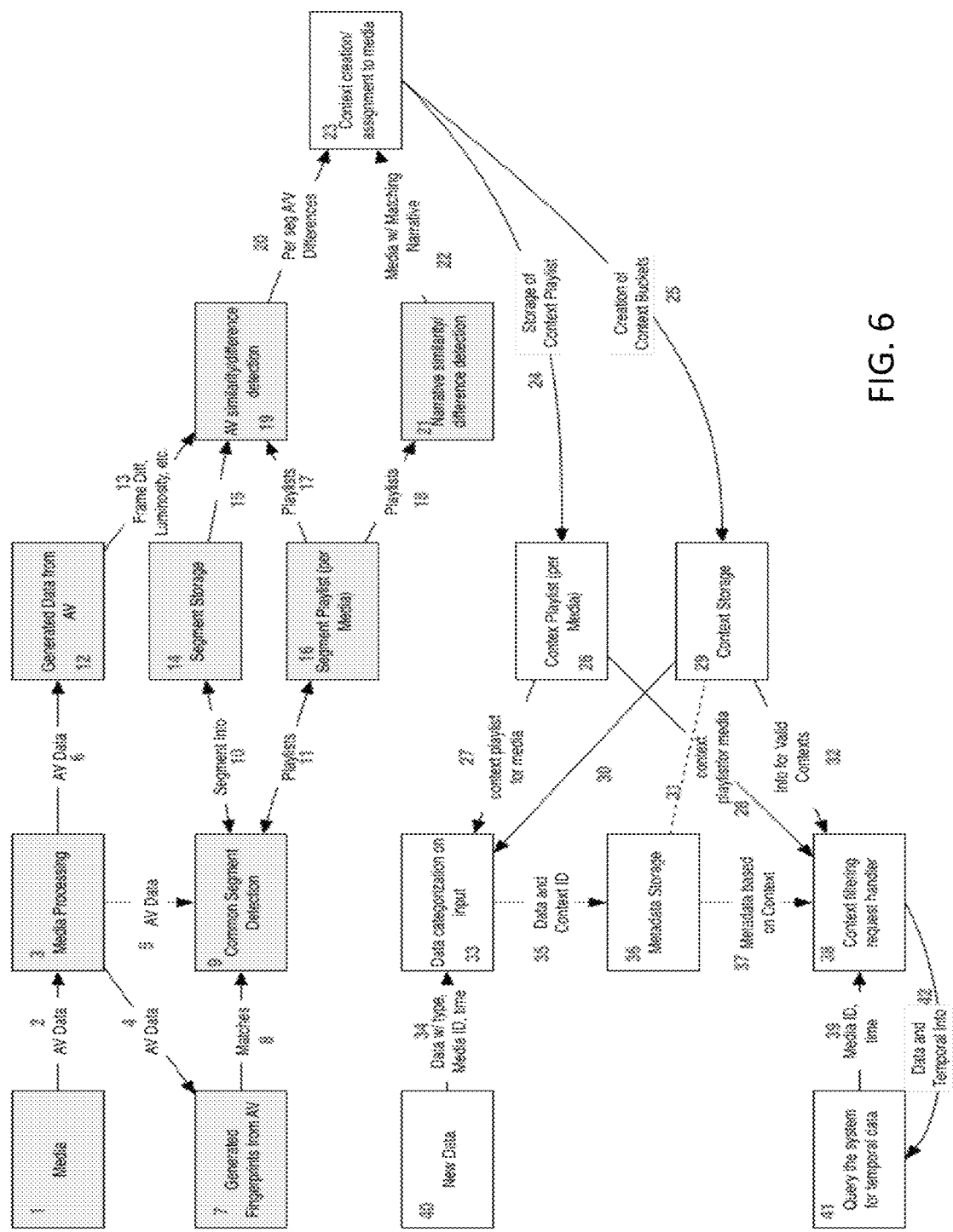
FIG. 6 illustrates an overview flowchart for a process for metadata management and delivery in accordance with at least one of the various embodiments.

FIG. 6 illustrates component/flow hybrid diagram for a process and logical architecture for in accordance with at least one of the various embodiments. As shown in the flow chart, various embodiments can be characterized in terms of three main processes: adding media data to the system, adding temporal data to the system, and querying the system for temporal data.

Adding Media Data to the System.

At block 1, in at least one of the various embodiments, media data from raw media signals are added to the system by extracting and sending signature data as shown at path 2, for example audio and video data, for media processing at block 3, which passes the audio-visual (AV) data via paths 4, path 5 and path 6 for processing as described below.

At block 7 the media data, for instance audio-visual (AV) data shown at path 4, is used to generate signatures, for example audio or visual fingerprints or both. The system employs ACR to determine if the signature matches signatures in the signature database 401, and as shown in path 5 sends them to the common segment detector 316. At block 9 the common segment detector 316 detects common segments as described below. As shown at path 10 in at least one of the various embodiments, the common segment detector 310 accesses segment information creates and/or edits segments stored in the segment database 404, and as shown at path 11 the common segment detector 316 system accesses and edits media playlists, which at block 16 are stored on a per-media item basis in the media playlist database 407.

FIGS. 7A-7F illustrate an exemplary process for common segment detection and creation in accordance with at least one of the various embodiments. As described above each piece of media needs to be processed and added to the system. In at least one embodiment, each item of media is processed so as to create a new entry in the media playlist database and any new segments in the segment database.

Figure 7A:
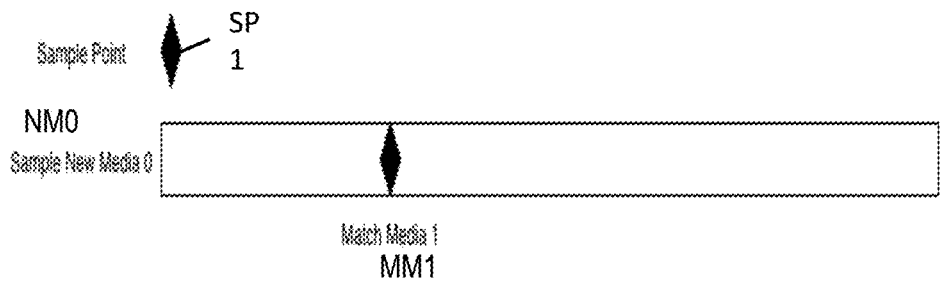
FIGS. 7A-7F illustrates common segment detection and creation in accordance with at least one of the various embodiments.

In FIG. 7A, the process starts with the common segment detector 316 sampling a signature for a new media item and then comparing the signature sample SP1 of the new media item NM0 against the signature database to identify at least one segment in common with a matching media item signature MM1. In an embodiment, the signature database is an ACR database with ACR audio fingerprints, although in another embodiment, the database could include other signature data, for example video fingerprints for both audio and video fingerprints. Accordingly, at FIG. 7A the system is configured to sample the new media and using the ACR database to detect other media that match the sample of the ACR fingerprint.

Once the system compares the signature sample SP1 of the new media NM0 item against the signature database to identify segments in common with a matching media item signature, the comparison produces a shared segments list, with the list times in each media. In an embodiment, an identified segment ID:1 lists as a match the following exemplary shared segments list:

Media:1, start:0:00, end:5:00, Media:New, start:20:00, end:25:00.

Figure 7B:
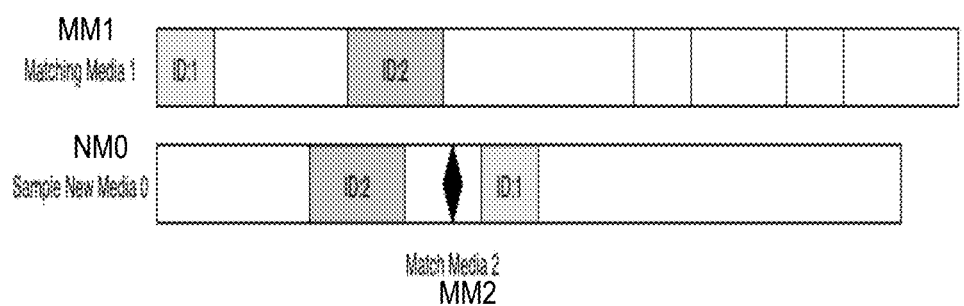

Next, as shown in FIG. 7B, the process comprises retrieving a matching media playlist MM1, which includes one or more previously identified segments ID:1, ID:2. The one or more identified segment IDs are assigned or mapped to the times where they are used in the signature of the new media NM0, in this case the ACR fingerprint of NM0, in a segment list for the new media item. The segment list for the new media item NM0 comprises a list of segment IDs for existing segment as identified in the first matching media item MM1, and includes the following information:

ID:?, ID:2 (10:00-18:00), ID:?, ID:1(20:00-25:00), ID:?

Thus existing segment IDs are assigned to the times where they are used in a media playlist for the new media.

In the exemplary embodiment of FIG. 7B, the system is configured to sample signature data corresponding to at least one unidentified segment in the media playlist for the new media item. The system is configured to sample the media signature corresponding to one of the remaining unknown segments and find other matching media via the ACR database, for example an ACR Database of audio fingerprints. As shown in FIG. 7B, a sample is taken corresponding to an unmatched segment that occurs between identified segment ID:2 and identified segment ID:1, although as will be appreciated, any unknown segment of the segment list can be sampled. The system then performs another iteration of the process as the sampled data is compared to the signature database and matched with a second matched media item MM2.

Figure 7C:
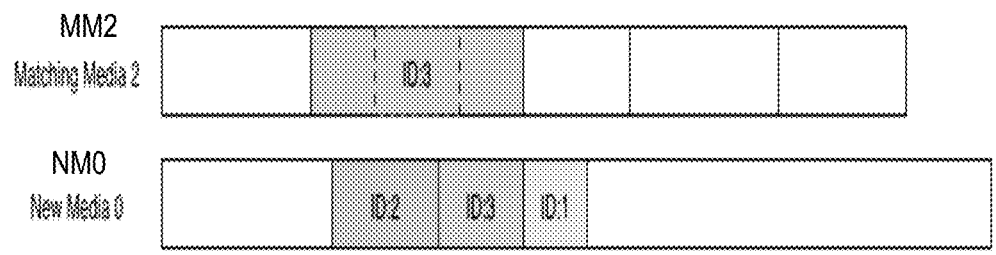

As shown a FIG. 7C, the one or more identified segment IDs from MM2 are assigned or mapped to the times where they are used in the signature of the new media NM0 in the segment list for the new media item. The segment list for the new media item NM0 comprises a list of segment IDs for existing segment as identified in the first matching media item MM1 and second matching media item MM2, and the segment list includes the following information:

ID:?, ID:2 (10:00-18:00), ID:3 (18:00-20:00), ID:1(20:00-25:00), ID:?

Figure 7D:
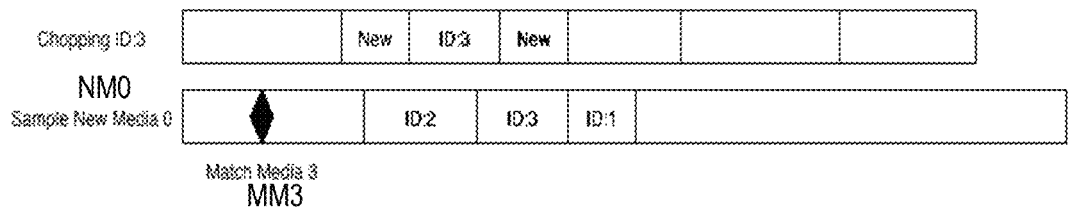

The identified signature data in the new media item NM0 corresponding to ID:3 in the second matching media item 2 is shorter in duration than the corresponding previously identified segment from the second matching media item. When a segment matches a smaller segment of an existing segment, then the existing segment needs to be divided. As shown in FIG. 7D, the segment ID:3 of the second matched media item MM2 is divided into one or more additional new segments. In the example, the ACR comparison mapped a small segment of the new media into a larger existing segment ID:3 of the second matched media item MM2. The existing segment ID:3 is chopped so that segments are always fully used by all media in which they are present. New segments are added to the Segment DB. The system then performs another iteration of the process as another portion of the signature data for the new media item NM0 corresponding to an unidentified segment is sampled, compared to the signature database and matched with a third matched media item MM3.

Figure 7E:
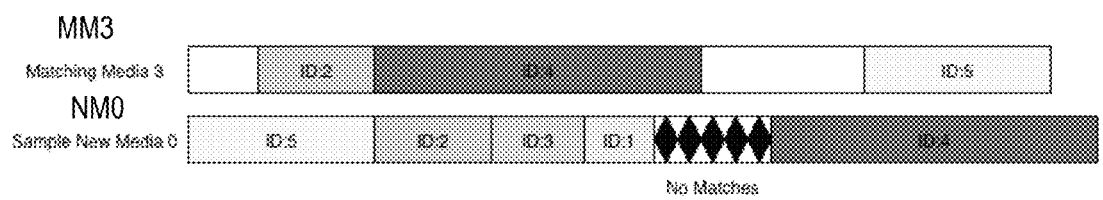
Figure 7F:
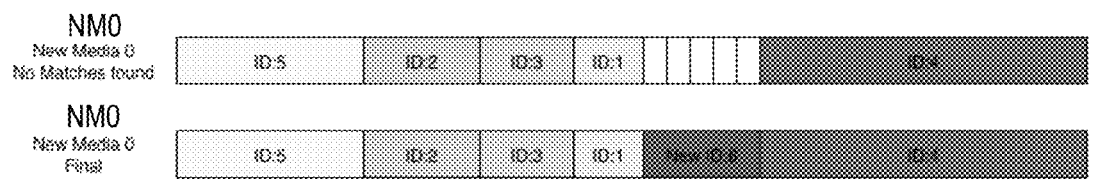

As shown in FIG. 7E, the process repeats until all matches are found and any unidentified segments will be tested enough for the system to be satisfied that the segment is truly new to the segment database. For example, as shown in FIG. 7E, matches are found in a third matching media item MM3 for segments ID:4 and ID:5, which are mapped to the segments in the new media item NM0 at the relevant times for the sections. If no more matches are found after the repeated iterations and the new media item NM still includes unidentified segments, the system determines that the new media item NM0 includes segments that are new to the Segment Database. Any segment for which no matches were found in the signature database is given a new segment ID. For example, as shown in FIG. 7F, the unidentified segment of the new media item is assigned a new segment ID:6. The new segment ID:6 is added to the Segment DB with a normalized start and end time. The final new media item NM0 can then be added to the Media Playlist Database as a new media playlist NMF. For example, the segment list for the new media playlist NMF shown in FIG. 7F can be:

ID:5 (0:00-10:00),
ID:2 (10:00-18:00),
ID:3 (18:00-20:00),
ID:1 (20:00-25:00),
ID:6 (25:00-33:00), and
ID:4 (33:00-51:00).

Figure 8A:
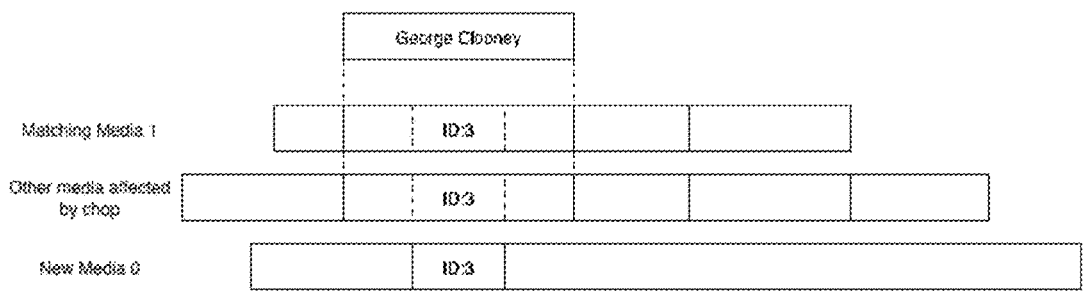
FIGS. 8A-8C illustrate segment division in conjunction with common segment detection in accordance with at least one of the various embodiments.
Figure 8B:
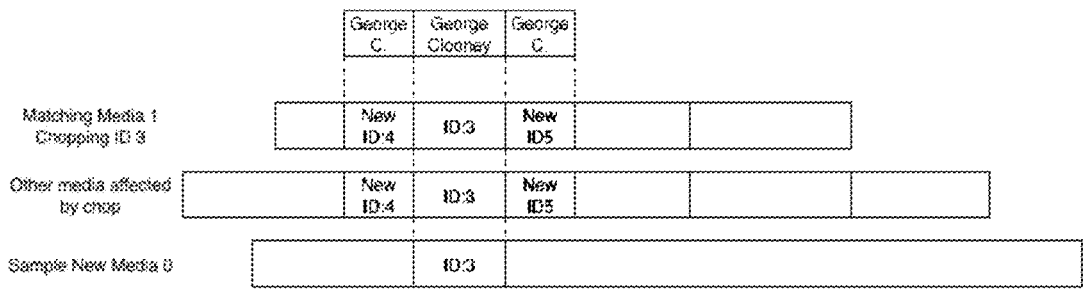
Figure 8C:
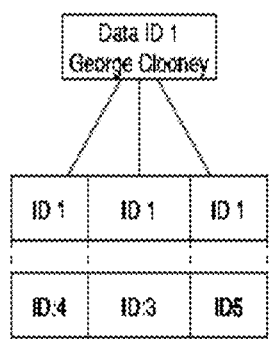

As noted above with respect to FIGS. 7C-7D, previously identified segments can be divided in the process of identifying and segmenting new media items. Dividing a previously identified segment can affect other media in the system that includes the same segments. The division also affects data that has been associated with the segments. For example, as shown in FIG. 8A, the segment ID:3 may be associated with specific metadata, for instance, George Clooney's presence in a movie scene. Two other media items, for example two media playlists representing two different versions of that same movie, can be in the system and use segment ID:3. A new piece of media is added NM0, which only uses a portion of the segment. The system chops ID:3 into three smaller segments. Any media playlist that uses these segments will also need to be configured to use the new segments. As such, any data associated with the original segment can be split across the new segments as shown in FIG. 8B. Splitting the metadata can include data replication; however splitting metadata can be accomplished by other operations. For example, adding a layer of indirection to allow the overhead of the division to be minimal and avoid incongruities when the data needs to be updated, as illustrated in FIG. 8C.

Once all the media has been segmented and a database of shared segments has been created, then data can be associated with a moment or duration within one media and instantly shared with all other media via the segments. The shared data is stored in the metadata database, where each media item has its own media playlist, each playlist including segments, including shared segments as identified above. For example, as shown in FIG. 9, for media playlist X and media playlist Y, the system has determined they both share segment ID:6. Segment ID:6 includes metadata corresponding to the moment within segment ID:6 where George Clooney first appears on screen is at the same point for media X and Y. As such, data can be added when only one piece of media is available with which to reference the data. Data can also be readily retrieved since each media item has a unique media playlist comprising the segments. Each media playlist references a specific list of segments, and each segment includes a segment ID as well as the start and end times relative to this piece of media. The segments and media playlists can then be associated with metadata in the metadata database, for example via an associations database that correlates the Segment IDs and times to specific metadata.

As such, when an end user plays a piece of media on a media device, the playback time can be used to locate the segment that starts before the playback time and ends after the playback time. An offset can be calculated into the block as well to allow for time to access anticipated metadata. The system can then return any data from the metadata database associated with the segment and the playback offset into the segment.

As will be appreciated, the same process can be used with audio and/or video based ACR or other signature or fingerprint obtaining methods. If both are used, then in various embodiments the system can include an audio segment list and a video segment list for each piece of media.

Accordingly, embodiments as described herein enable the system to relate a piece of media to other relevant media data in a library. As described above, media can be mapped into common/uncommon segments along with a segment list for each media item, i.e. a media playlist. In embodiments, data for each common segment can be added to indicate if a shared segment shares audio, video, or both. This allows the system to share temporal data with other media and identify how one piece of media relates to another. However not all temporal data should be shared with other related media. For example, some data in a segment can related only to audio (e.g., song info), while some data can be associated only with the video (actor/character on screen), and other data may be for a specific narrative (movie or documentary about a movie). A common/shared segment may even be reused in the same narrative, so the narrative data may be different each time the segment appears. The system can thus be configured to include associate context data with media playlist and segments.

Returning to FIG. 6, at block 19 media playlists and video signatures are derived via a video context detector employing, for example, frame differentials or luminosity as shown at path 13 to detect AV similarities/differences per segment in the new media, the process for which is described in U.S. application Ser. No. 14/587,926, entitled Identifying and Categorizing Contextual Data for Media, filed on Dec. 31, 2014 concurrently herewith by the same Applicant, OpenTV, Inc, the entirety of which is incorporated by reference hereby, the entirety of which is incorporated by reference herein. At block 21, narrative context detectors access media playlists as shown at path 19 to detect media with the same narrative, the process for which is described in and in U.S. application Ser. No. 14/587,926, entitled Identifying and Categorizing Contextual Data for Media, filed on Dec. 31, 2014 concurrently herewith by the same Applicant, OpenTV, Inc, the entirety of which is incorporated by reference herein.

As shown at path 22, lists of media with the same narrative as identified at block 21 and at block 20 per segment AV differences detected at block 19 are passed to a context creation and assignment module 320. At block 23, the system is configured create content and assign to media by receiving the per segment AV differences detected at block 19 by the video difference detector along with a list of media with the same narrative as identified at block 21 via the narrative context detector and determine if existing contexts can be used (per segment) or to create new context categories as shown at path 25. In various embodiments, each segment of a media item will be assigned one or more context-per-segment in the media item's media playlist, which at path 24 is stored as a context playlist for the media playlist. At block 26 the system is configured to associate the contexts used by each segment such that contexts may be shared by other media in their relevant context playlist for the media playlist as described herein.

Figure 10:
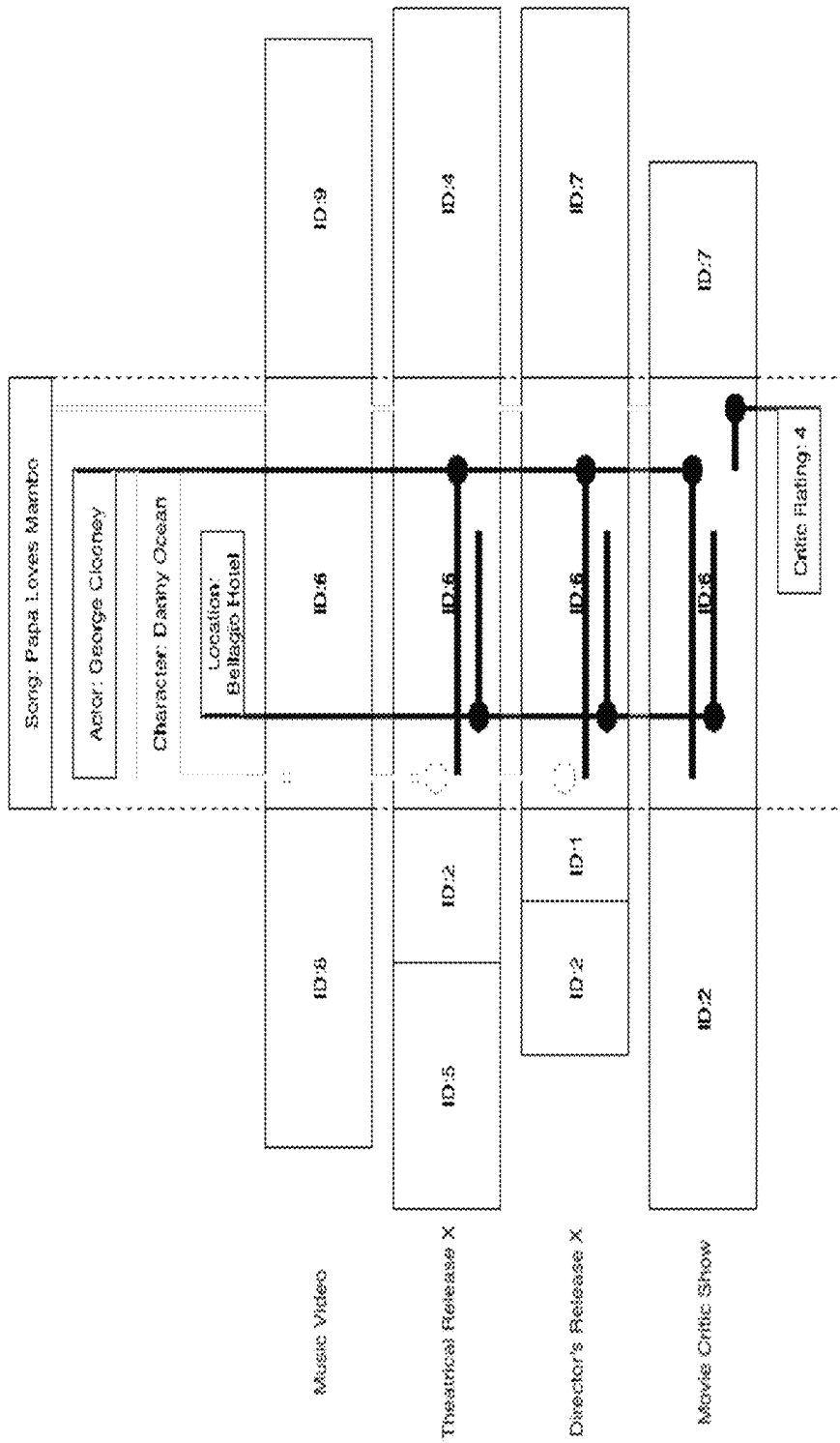
FIG. 10 is an illustration of an example of different context categories for a shared segment in accord with at least one of the various embodiments.

FIG. 10 is an illustration of an example of different context categories for a shared segment. As shown in the exemplary illustration, four media playlists can all include a common segment ID:6. The width of the blocks indicates duration of the segment. This diagram shows exemplary basic scenarios that can arise when sharing data or otherwise correlating media playlists using common segments. In the embodiment, the system identifies common segments determined by audio matching (e.g. ACR) as described herein. Five pieces of data have been associated with segment ID:6: a song "Papa Loves Mambo," an actor "George Clooney," a character "Danny Ocean," a location "the Bellagio Hotel." and a critic rating: "4." In the example:
  the song info applies to all four pieces of media, as the common segment is based on audio matching;
  the actor data does not apply to the music video because the actor is not on the screen;
  the character info only applies to the media that share the narrative of movie X;
  the location data applies to all contexts but the music video, since the video is different in the music video.
  The critic rating data only applies to the movie critic show's narrative.

In embodiments, the system is configured to build and track the various contexts to which metadata can be apply relative to each piece of media. Metadata can then be categorized by context upon input to the system. Some examples of the contexts may include: audio context, video context, and narrative context. In embodiments, metadata can be shared by sharing contexts. At any given moment, the system can allow a piece of media having multiple contexts to be merged when extracting the metadata for that moment.

For example, an audio context can be shared by two or more pieces of media if they share the same audio. Any data added to this context pertains to the audio and therefore applies to all media that use this context. A piece of data can be associated with an audio context, for example, "Song: Papa Loves Mambo" as shown in FIG. 10. A video context can also be shared if the media share the same video. Any data added to this context pertains to the video and therefore can apply to all media that use this context. A piece of data can be associated with a video context, for example "Location: Bellagio Hotel" as shown in FIG. 10. A narrative context can also be shared if the media share the same narrative. Any data added to this context pertains to the narrative of the media and therefore applies to all media that have the same narrative. A piece of data can be associated with a narrative context: "Character: Danny Ocean" as shown in FIG. 10.

Context creation and assignment to media items at block 23 of FIG. 6 takes place when adding metadata for a media item to the system. In embodiments, the media context categories for segments can include, for example, an audio context, a video context, and a narrative context. An audio context can be shared my multiple media items if they share the same audio. For example, a plurality of media playlists for a respective plurality of media items can share the same audio, and can have a shared segment as descried herein. Any data added to the audio context category for the shared segment can thus apply to all media that share the audio context, e.g. via the shared segment.

Figure 11:
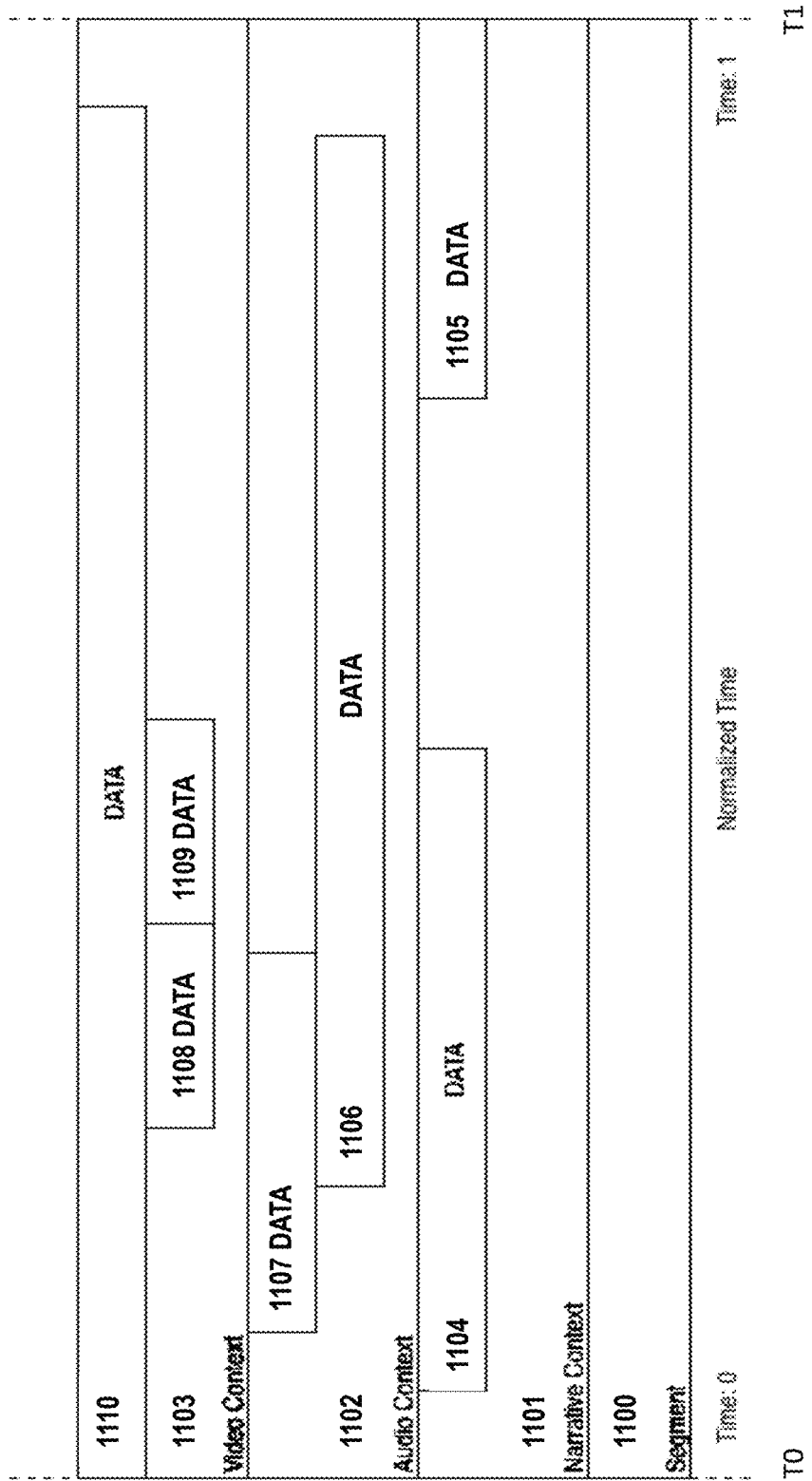
FIG. 11 illustrates an example of contextual data associated with different context categories in a segment in accordance with at least one of the various embodiments.

FIG. 11 illustrates an example of contextual data associated with a single segment. For example, a common segment detector as described herein builds a playlists of common segments for each piece of media in the system. The system can include a context creation and assignment module 320 configured to augment each segment 1100 with context tracking capabilities. Each context 1101,1102,1103 is valid for the duration of the segment 1100. Each context 1101, 1102,1103 acts as a container for data items 1104, 1105, 1106, 1107, 1108, 1109, 1110. Each associated data item 1104, 1105, 1106, 1107, 1108, 1109, 1110 has a normalized start and stop time within the segment. For example, within the segment 1100 having a normalized time T0 to T1, data item 105 starts at 0.75 and ends at 1.0 and is associated with narrative context 101.

Figure 12A:
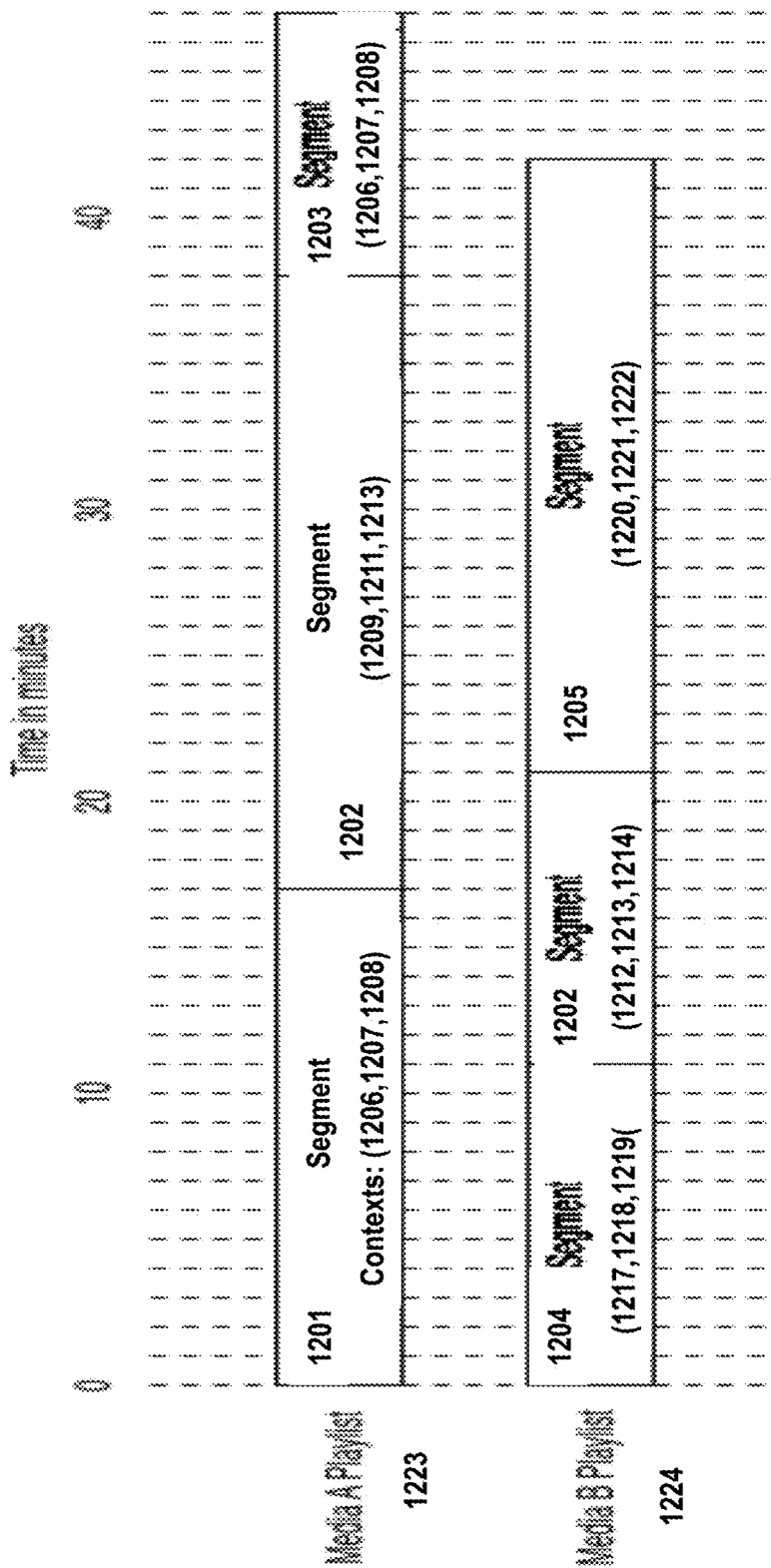
FIGS. 12A-12B illustrate examples of context augmented media playlists in accordance with at least one of the various embodiments.
Figure 12B:
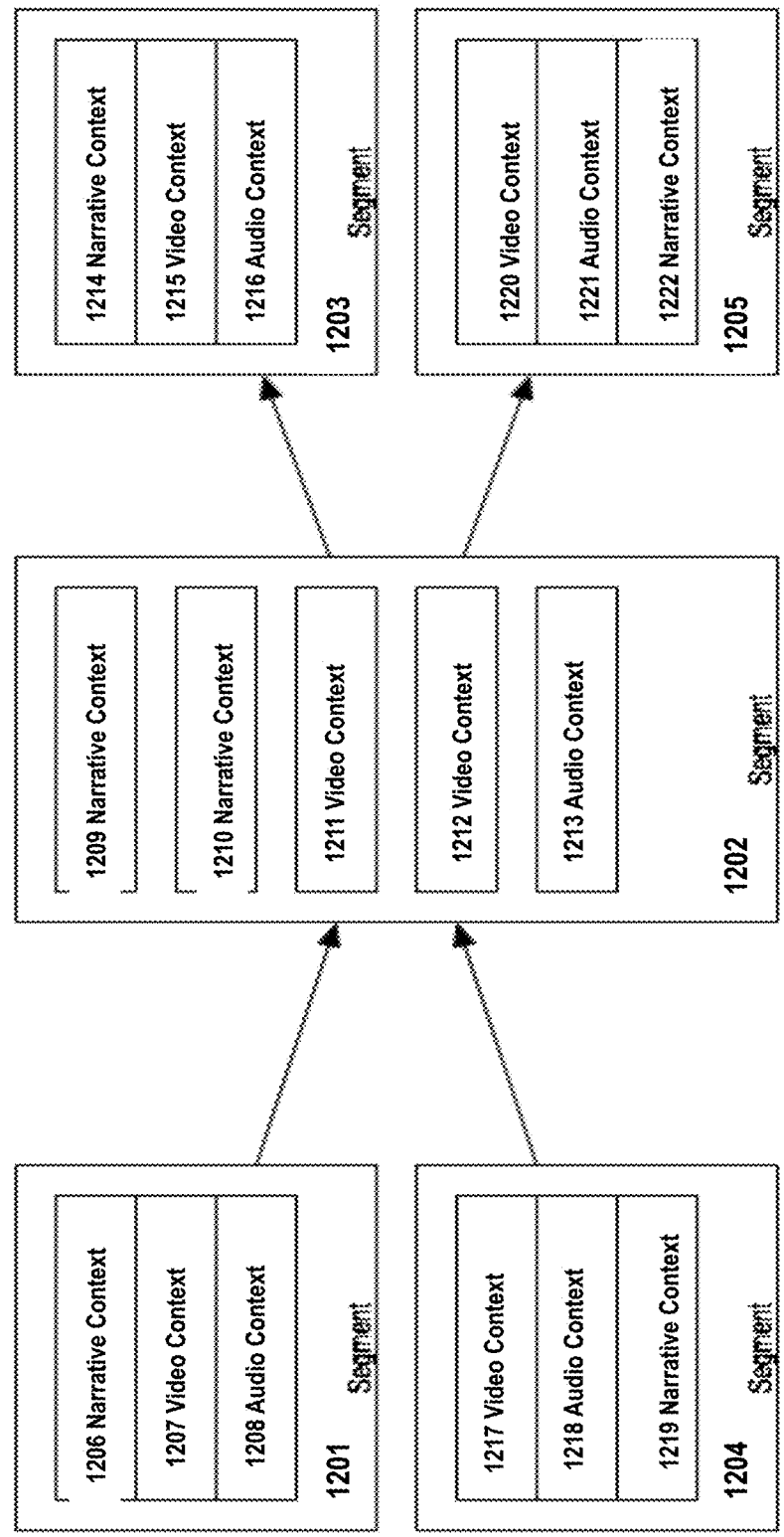

As shown in FIGS. 12A-12B, media playlists 1223,1224 for respective media items are also augmented to track which contexts are valid at each segment in the playlist. This diagram illustrates two media playlists for media A 1223 and media B 1224 with context tracking information attached. Segment (1202) is used in both media, but they only share the audio context (1213). When Media B (1224) was added to the system, the narrative context detection determined that narratives are different, the video is different, but the audio is the same. Thus Media B has a different video context and different narrative context from Media A, but both Media A and Media B have the same audio context.

FIG. 12B shows a "segment perspective" logical structure of the data. Again, segment 1202 is used in two playlists for media A 1223 and media B 1224, but the two playlists do not share narrative or video contexts so there must be two of each of these contexts associated with the segment narrative 1209, 1210, video 1211,1212. The audio context 1213, however, is shared in both playlists. This scenario occurs, for instance, when the audio of a song is used in two otherwise different pieces of media such as a movie and a music video.

Figures 13A, 13B:
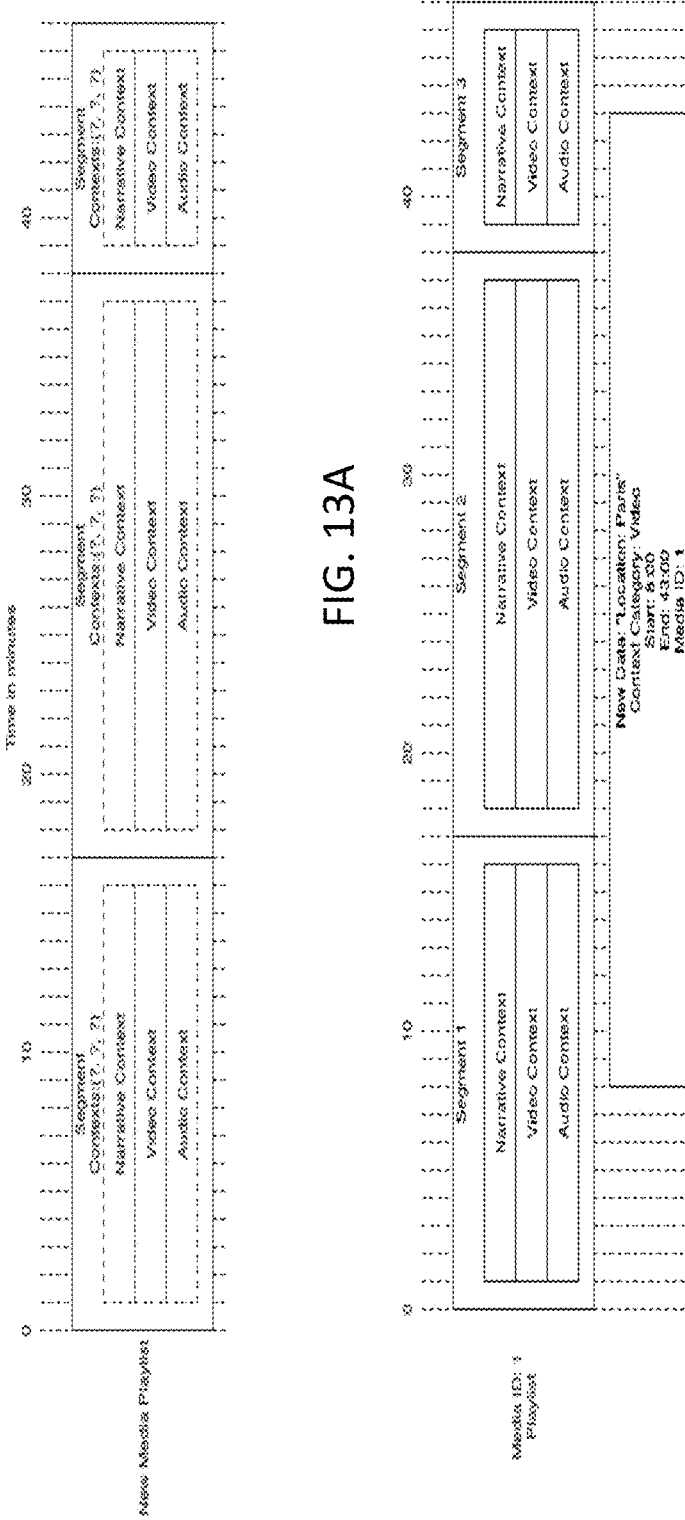
FIGS. 13A-13D illustrate an example of a process for associating new context data in accordance with at least one of the various embodiments.

For each media playlist and each segment in a respective media playlist, there can be one audio context, one video context, and one narrative context. As shown in FIG. 13A, initially contexts are undefined for each segment in a media playlist, the unassigned contexts illustrated as dashed lines. The three contexts can be associated with each segment in the playlist; these contexts can be new or existing contexts. For each segment, the contexts are selected in accord with the following process.

Selecting an audio context—As described herein, in embodiments audio ACR can be used creating segments in the system, including common segments. In embodiments where audio ACR is employed to identify and add segments, the audio context is the same for all media that use this segment. Accordingly, the audio context in the segment can be selected for a new media playlist. If no audio context exists for this segment, then a new one will be created.

Selecting a video context—To select a video context, the system can use video difference detection to detect if the video during a segment in a new media item matches the video of any other media item that uses this segment. In one embodiment, this can be done using information derived from the original video data, such as video signature data derived from a video difference detector employing frame luminosity or a sequence of frame differentials as described in U.S. application Ser. No. 14/587,926, entitled Identifying and Categorizing Contextual Data for Media, filed on Dec. 31, 2014 concurrently herewith by the same Applicant, OpenTV, Inc., the entirety of which is incorporated by reference hereby. In an alternate embodiment, video signatures from video ACR as known in the art can be employed. If no matches are found, a new video context for the segment will be created.

Selecting a narrative context—To select a narrative context, the system can use narrative similarity/difference detection to determine other pieces of media in the system that have the same narrative. In various embodiments, the system is configured to employ a narrative context detector such as a narrative detection algorithm, for example a modified string edit distance algorithm applied to the segments in the playlists, as described in U.S. application Ser. No. 14/587, 926, entitled Identifying and Categorizing Contextual Data for Media, filed on Dec. 31, 2014 concurrently herewith by the same Applicant, OpenTV, Inc., the entirety of which is incorporated by reference hereby. If one of the narrative contexts in this segment is used by one of the pieces of media with the same narrative, the narrative can then be selected as the narrative context for the new media. If no matches are found, then a new narrative context will be created.

As such, in various embodiments context selection can be determined can be for each of a plurality of contexts as derived using, for example, audio detection (e.g. ACR), video detection (ACR or video difference detection) or context detection as described above and in U.S. application Ser. No. 14/587,926, entitled Identifying and Categorizing Contextual Data for Media, filed on Dec. 31, 2014 concurrently herewith by the same Applicant, OpenTV, Inc., the entirety of which is incorporated by reference hereby. However in embodiments, the system can be configured to detect one or more of the contexts with out independently deriving others. For example, the system could be configured to use audio detection alone (e.g. audio fingerprinting) to determine audio, video, and narrative contexts, relying on, for example, the common segment detection to assure that the audio context implies or is sufficiently correlated with other contexts.

In various embodiments, at block 33 contexts can be assigned to new data for media items added to the system. At block 40, new data for a media item is added to the system. The new data for the media item can be associated with one of the contexts in a segment in order for it to be identified as a shared context for the segment. In embodiments the system can be provided with a context category of the data (audio context, video context, or narrative context), or the system can be configured to derive context categories, for example by using video difference detection, context difference detection, or audio difference detection as described herein and in U.S. application Ser. No. 14/587, 926, entitled Identifying and Categorizing Contextual Data for Media, filed on Dec. 31, 2014 concurrently herewith by the same Applicant, OpenTV, Inc., the entirety of which is incorporated by reference hereby. As shown at path 34, the data can also be accompanied by a media identifier and timing information about where the data should be applied to the media timeline. This could be a single time offset or a start and end time as described herein.

Figure 13C:
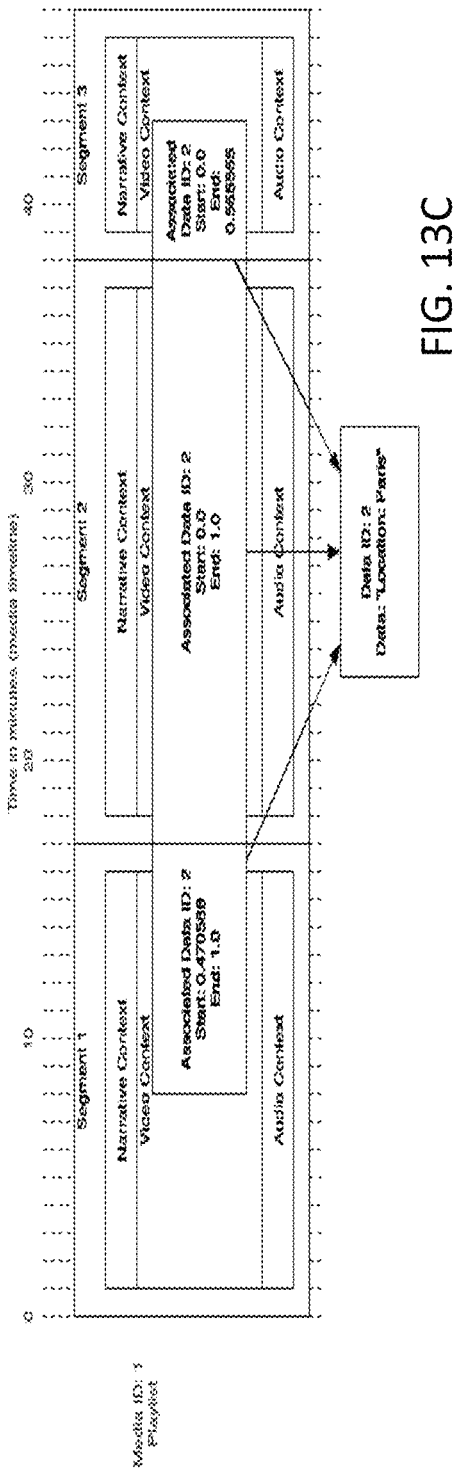

For example FIGS. 13B-13C illustrates an example of new context data to be associated with a media playlist ID 1. As shown in FIG. 13B, the new context data for "Location: Paris" is identified as associated with media playlist ID1, which includes segment 1, segment 2 and segment 3. The media playlist also includes a Video Context category, and accordingly the system is configured to store new context data to the Video Context category ("Context Category: Video") of any segment to which the video context applies. The system is also configured to identify a start and end times relative to the media playlist timeline, for example a start at 8 minutes (Start: 8:00) and an end at 43 minutes (End: 43:00) for the "Location: Paris" metadata attached to the video context.

As shown at FIG. 13C, the start time and end time can be mapped to the sequence of segments (segment 1, segment 2 and segment 3) and start time and end times ranges within these segments. As described herein, a segment can have a normalized start and end time, which can be mapped to the start and end times for the media playlist. For example, as shown in FIG. 13C, the new context data for "Location: Paris" is identified as Data ID:2 and associated with media playlist ID1 as "Associated Data: ID:2" across segment 1, segment 2 and segment 3. Associated Data ID:2 for the Video Context can apply at the normalized start time of 0.47588 to a normalized end 1.0 of segment 1, which maps from 8/17 minutes to 17/17 of segment; the Video Context continues to apply through all of segment 2 (normalized Start: 0.0 to End: 1.0) and maps from 0/21 to 21/21 minutes. The Video Context applies at segment 3 from 0/9 minutes to 5/9 minutes (normalized Start:0, End:0.55565). The data may simply be referenced in each context to maintain the integrity of the data. The system can be configured to employ the process for data in any context categories (e.g. narrative, video, audio).

Adding Temporal Data to the System

When new data is added to the system, it can be associated with one of the contexts in a segment in order for it to be shared. The data can either be provided with the general context category of the data (audio, video, narrative) or it can be configured derive the context category. The data can also be accompanied by a media identifier and timing information about where the context data should be applied to a media playlist timeline. This could be a single time offset or a start and end time. The media item data can then be stored in metadata storage and associated with the correct context in a context category database.

As described above, at block 40 new data is input and at path 34 is passed to the data categorization system with a context category and media identifier, and time (start, end) information. At path 27 the context playlist for the media is also passed to the data categorizer. At block 33 the data categorizer can then look up the context playlist stored at path 24 for the associated media item. The data categorizer uses the timing information and context category included with the new data, along with the context playlist to identify which contexts to apply to the data. At path 35 the media item data and context identification data is passed to the metadata storage database. The media item data can then be stored in the metadata storage database at block 36, and at path 31 the media item data can be associated via the associations database with the correct context category of each of the affected segments as stored in context category database at block 29.

Query the System for Temporal Data

At block 41, a request can be made for temporal data. At path 39, the media ID and timing information 39 (e.g., stop, end, offset) is sent to a context filtering request handler. At path 28 the context playlist for the media is sent to the context filtering request handler. At block 38, the context filtering request handler gets context playlist for the media from the context playlist storage database at block 26 and determines the valid contexts for the time range specified at path 39. At block 38, the context filtering request handler also gets information for valid context categories for the data from the context storage database as shown at path 28. At block 38 the context filtering request handler determines the valid contexts for the time range specified in block 39. As shown at path 32, the request handler uses information about the valid contexts to then gather context metadata about the media item as shown at path 37 that corresponds to the timing information for the query sent at path 39. At path 42, the system can then return a response to the query including the context metadata with timing information.

Figure 13D:
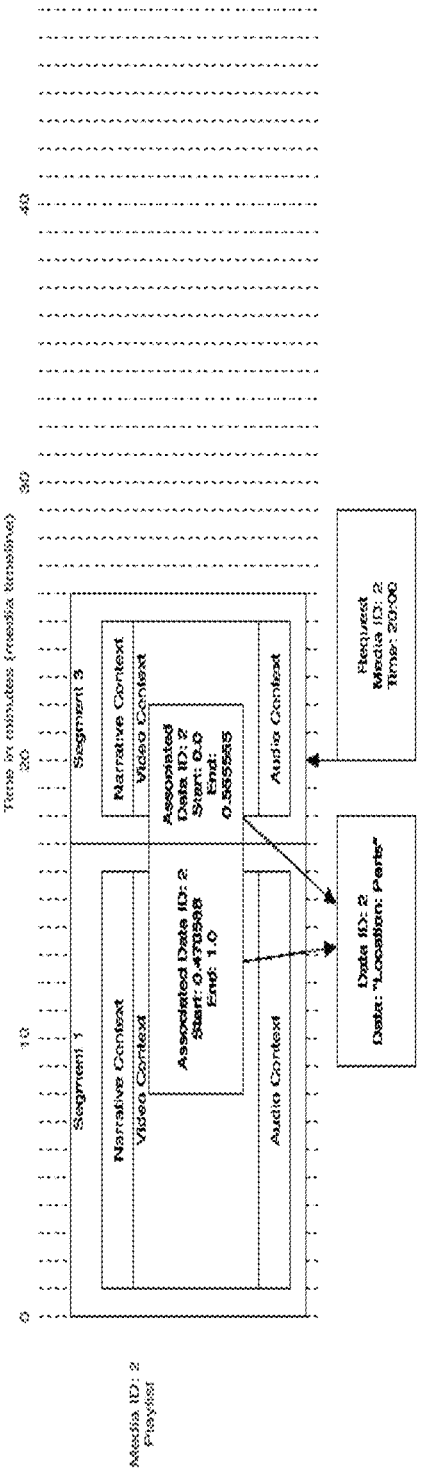

FIG. 13D illustrates an exemplary embodiment of the context filtering request handler providing data about a moment in a specific piece of media if it is given a media identifier and a time offset in the timeline of the media. FIG. 13D illustrates a media playlist ID:2 including associated data ID 2 for the media playlist. The media playlist ID:2 includes Segment 1 and Segment 3, which are common segments with media playlist ID:1 as illustrated in FIGS. 13A-13C, however the playlist does not include Segment 2. As explained herein, such common segments occur in related media playlists, for example, a regular release of a movie and a director's cut, where the latter may have different or additional segments.

A request is made for 20:00 minutes into media ID 2. The system locates the media playlist ID:2 and determines that 20:00 minutes into the timeline corresponds to 3/9ths of the way into Segment 3. The associated data ID:2 overlaps with the request time, so Data: ID 2 "Location: Paris" is valid at this point and its data can be returned in response to the request. The context specific data can thus be successfully identified in common Segment 3 belonging to media playlist ID:1 at 41 minutes in and to media playlist ID:2 at 20 minutes in.

In various embodiments, retrieval of data may be for a range of time as well as a single point in time. For example, a request can include a time range, and if the requested time range intersects with a data range one or more segments in a media playlist, the system can return a response for the relevant range.

Also, although the embodiments are described for audio, video, and narrative contexts, additional contexts can be created and used to store and share data by employing the systems processes described herein. For example, a "Premium" context category could be created and data could be directly identified and added to this context. Access to data associated with this context may be restricted based on, for example, an end user's permissions.

Media Moments Links

In various embodiments, the system is configured to allow end users to create a sharable media link to moments in a media, identifiable by data in segments. The media links can be used to build a sharable media playlist of media links. In embodiments, the system is configured to generate media links, one exemplary advantage being, inter alia, just-in-time resolution of media links to titles in different media libraries.

Figure 14:
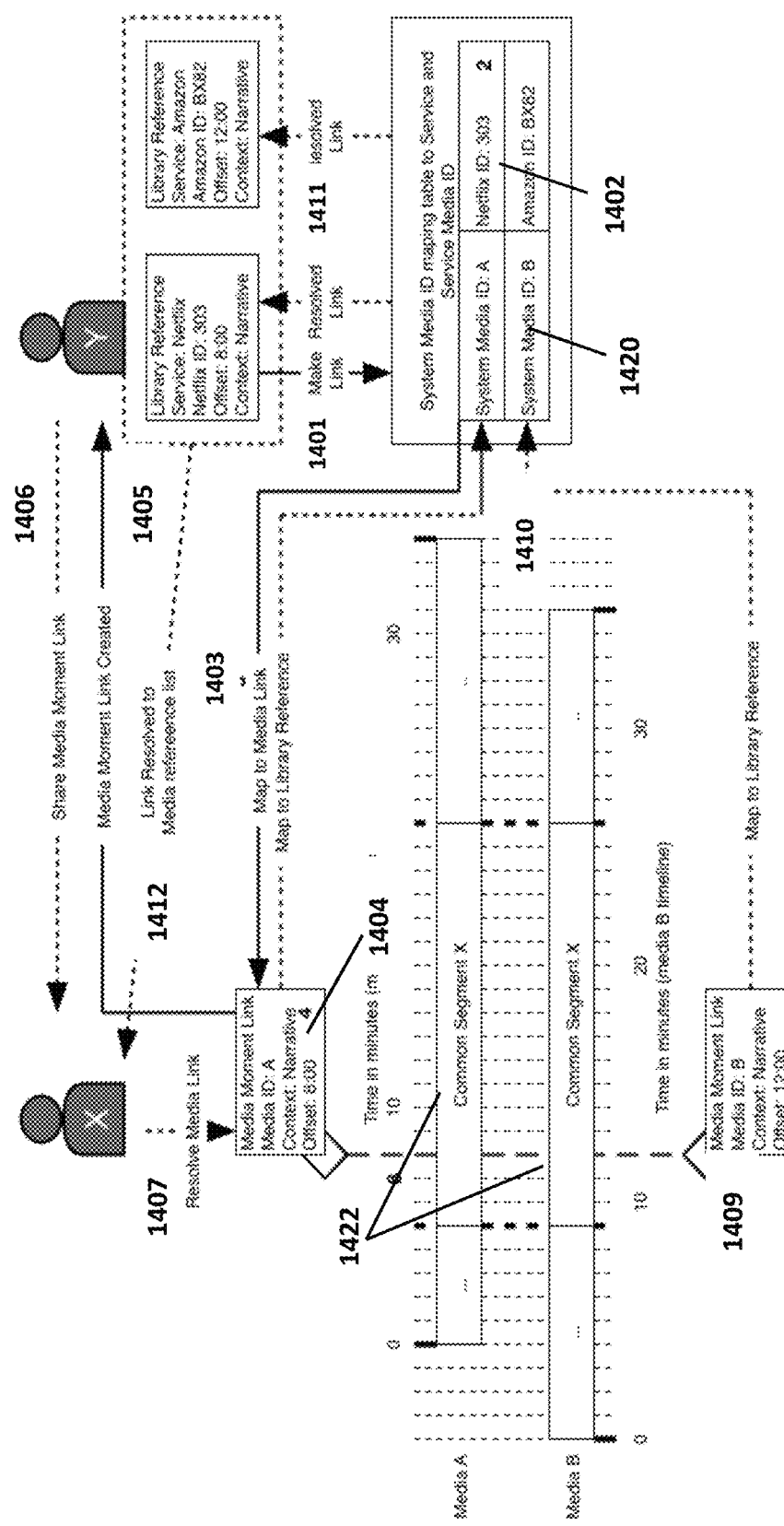
FIG. 14 illustrates an example a process for creating and resolving a media moment link in accordance with at least one of the various embodiments.

Media metadata from media items from a plurality of media libraries can be added to the system and processed to identify and store, inter alia, common segments, media playlists, and context data in accord with the embodiments described herein. The system can be modified to capture additional information about the media library from which each piece of media came and create and/or store a unique identifier that can identify the media item to the original library. For example, as shown in FIG. 14, media library identification and mapping data is captured in a "System Media ID Mapping Table" 1420 which associates system media identification to a service and Service Media ID for a service associated with the media library, for example a streaming media service for streaming movies and/or music and other media, such as Netflix, Amazon, Acorn, Pandora and so on, which can be configured as follows:

| System Media ID: A | Netflix ID: 303 |
|---|---|
| System Media ID: B | Amazon ID: BX82 |

Media is mapped to find common segments and determinations are made to identify the audio, video, and narrative contexts used throughout each piece of media as described herein. In the example in FIG. 14, media playlist Media A and media playlist Media B share common segment X 1422 and the system has determined that the narrative contexts are the same for the Common Segment X.

The system is configured to create or include additional structures to allow a media moment to be shared using, inter alia, a media segment and media segment playlist. The system is configured to employ a just-in-time approach for resolving media links to available media. Exemplary advantages for this approach are that there is no additional overhead within the system per media link created by the users, and the links need never expire and can always be resolvable in the system.

In various embodiments, three main processes are shown in the example of an embodiment shown in FIG. 14: (1) creating a Media Moment Link (MML), (2) sharing a MML, and (3) resolving a MML.

(1) Creating a MML—As shown in the example User Y is watching Media A via a streaming content provider such as Netflix and decides to share a moment at 8:00 minutes into Media A. A library reference is created that captures the service, service media ID, a time offset, and a context, for example, a narrative context. At 1401 this information is sent to the system. The system is configured to map the service media ID to the system media ID 1402. At 1403 the mapping converts the ID to a library independent system identifier and packages the new ID, context, and time offset into a new MML 1404. At 1405 the system is configured to return the MML to User Y.

(2) Sharing a MML—User Y is now free to share the MML link 1404 with friends, post it on the internet and social media, etc. The MML 1404 could be encoded as text, binary, or a URL or other forms of providing links as known in the art. As shown at 1406, the MML 1404 can then be shared to User X. At 1407 the system is configured resolve MML 1404 from User X.

(3) Resolving a MML—In various embodiments, at 1408 the system is configured to employ the common segment identification described herein to identify media playlists that share the same moment. The system can filter the matches based on the requested context as described above with respect to, inter alia, FIGS. 13C-13D. As shown in the example, the requested context is the narrative, so only media that have the same overall narrative will be returned. However audio or video contexts could have been requested instead of the narrative. For example, in where only audio context is requested, the system can be configured to ensure that the audio context is the same for all matching media returned (where a user cares only about sharing a song and not caring what video or narrative it is heard in, for instance). Similarly, the system can be configured to create a video context MML, for example where a user cares only about the video content.

At 1409 the system resolves the MML 1404 to an additional MML 1409 based on the common segments and the common context, in this instance the narrative. The two MMLs must still be resolved to external media references using the mapping table 1420. The mapping table translates the links back into library references 1411 that include the service identifier, the service specific media identifier, and the service specific offset into the media. At 1412, the two library references can be returned to User X, who can now use the media library from a service (Amazon) to view a moment that User Y shared while watching media via a different service (Netflix).

Accordingly exemplary advantages of various embodiments include the ability to allow a user to create a MML against one version of a media item, for example a theatrical cut of a movie, which can be resolved to the same moment in a different media item, for example the directors cut of that movie, where that moment may be at a very different time in the media items. For example one media service may have version of a movie or show that has a moment that is 39 seconds behind another service's version of that same movies for the same moment.

Sharing Segments and Playlists of Segments

In various embodiments, the system can be configured to allow users to share more than just a moment, for example, a range of time within a piece of media or scenes from multiple pieces of media. The requested range, among other things, may only be available in one system or media library, while other portions may be available in a different system or media library.

Accordingly, in various embodiments a MML can be expanded to include an end time, giving the MML a range with a start time and an end time to form a Media Cut (MC). The system can be configured to resolve a MC into a media playlist. The media playlist can be used to resolve pieces of media in each media library that can fulfill a portion of the MC, including the start and stop time in those libraries. A user/client system can then use the MC to determine how to render the complete cut by using any of the available media, which may in possibly multiple media libraries, and can be used for a single rendering of the media playlist.

Figure 15:
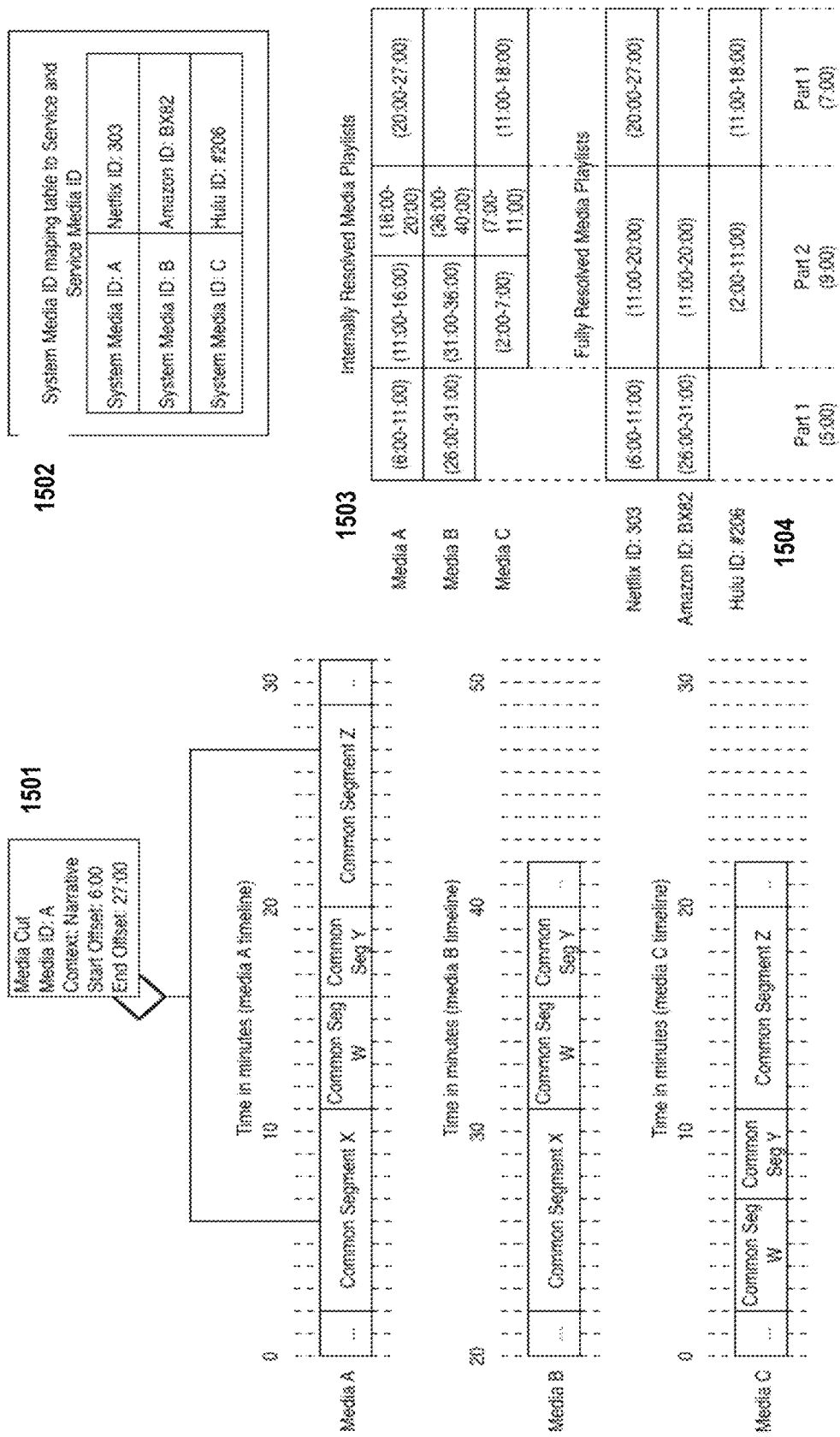
FIG. 15 illustrates an example of a process for creation and resolution of media playlist for a media cut in accordance with at least one of the various embodiments.

FIG. 15 illustrates an example of creation and resolution of media playlist for a MC. The system is configured to allow sharing the media playlist by sharing the media playlist structure.

At 1501, a MC is created in the same manner as the MML. At 1502 a media ID from the service is mapped to a system media ID. The MC includes a Start Offset and an End offset in the original media, which is mapped to the media playlist.

The system uses the common segment identification as described herein to identify all the segments that comprise the MC. For example, as shown in FIG. 15, parts of segments X and Z as well as the complete W and Y segments are shared by the MC. The system is configured to locate other media that use these common segments and again match the requested context as described herein. As shown in the example of FIG. 15, media playlist A, media playlist B, and media playlist C all have a common narrative context.

At 1503, the segments are mapped to time ranges for each common segment and matching media. Segments of the MC that can be fulfilled by all of the matching media can be merged and the internal media IDs can be mapped to external media IDs. A fully resolved media playlist 1504 can then be captured in the structure and returned to the client or user. The client or user can then decide which services to use to render the complete MP. In some cases a user may not be able to render the complete playlist or may need to use multiple services to render the playlist.

In various embodiments, the system is configured for Sharable Media Cut Lists (MCL). MCLs allow MCs to be concatenated into a list. Each MC is resolved as described above, and the results can be concatenated into a media playlist that represents the list of MCs as a single MC. A user can then obtain scenes from many pieces of media, including those across different media libraries, and share it with other people via the Internet, social media, texts, email, etc.

In various embodiments the system or the client can filter the library references based on access rights/subscriptions. For example, a request to resolve a MML, MC or MCL may also include information indicating that the user only has access to Netflix.

In various embodiments personal digital libraries, for example personal video recorder (PVR) recordings or other personal media can also be supported by this system. For example, each user can have a unique identifier for their media library, for example, a service ID or library ID. Each piece of media in their library can be ingested into the common segment system. Optimizations can be performed to associate media with multiple libraries if they are the same. For PVR based libraries, for example, the user's association with a piece of media may expire or be removed if it is detected that the media is no longer present in the library. The system can be configured to have a request be made against a finite set of services/libraries, to avoid returning a list of every other user's PVR drives that have matching media to a resolve a request.

Among the exemplary advantages of storing MMLs, MCs, and MCLs as links relative to the media is that it allows the common segment system can adapt to new media that may alter the blocks used in the playlists, for example by dividing segments and propagating the change across media playlists as described herein with respect to FIGS. 8A-8C. If the sharable structures reference segments directly as opposed to through mapping tables as described above, then there would be potential for them to be invalidated when a segment must be split and assigned new IDs as described above.

It will be understood that each block, path or element of the flowchart and process illustrations, and combinations of blocks, paths, or elements in the flowchart and process illustrations, can be implemented by computer program instructions. These program instructions may be provided to a processor to produce a machine, such that the instructions, which execute on the processor, create means for implementing the actions specified in the illustrations. The computer program instructions may be executed by a processor to cause a series of operational steps to be performed by the processor to produce a computer-implemented process such that the instructions, which execute on the processor to provide steps for implementing the actions specified in the flowchart. The computer program instructions may also cause at least some of the operational steps shown in the blocks, paths or elements of the flowchart to be performed in parallel. Moreover, some of the steps may also be performed across more than one processor, such as might arise in a multi-processor computer system or even a group of multiple computer systems. In addition, one or more blocks, paths or elements, or combinations of blocks, paths or elements in the illustrations may also be performed concurrently with other blocks, paths or elements or combinations of blocks, paths or elements, or even in a different sequence than illustrated without departing from the scope or spirit of the invention.

Accordingly, blocks, paths and elements of the flowchart and process illustrations support combinations of means for performing the specified actions, combinations of steps for performing the specified actions and program instruction means for performing the specified actions. It will also be understood that each block or element of the flowchart and process illustrations, and combinations of blocks or elements in the flowchart and process illustrations, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

We claim:

1. A computer system for identifying and associating metadata across related media with the same content, the system comprising:
   one or more processors operative to execute instructions;
   an operative connection to a plurality of databases comprising:
      a segment database comprising a plurality of segments, each segment comprising a segment ID corresponding to a segment of a media item;
      a signature database, the signature database including signatures for identified media;
      a media playlist database;
      a metadata database; and
   non-transitory memory operatively coupled to at least one of the including computer executable instructions; the one or more processors programmed at least to, when the program memory instructions are executed by the processors,
      a) sample a signature for a new media item;
      b) compare the signature sample of the new media item against the signature database to identify at least one segment associated with the signature in common with a matching media item;
      c) retrieve a media playlist associated with the one or more previously identified segments for the matching media item from the media playlist database, each media playlist associated with one or more segments and a start time, and an end time corresponding to a each segment of a media item
      d) assign one or more segment IDs to the common segments associated with the signature in the new media item at a time location in a segment playlist for the new media item;
      e) identify a segment within the sample of the new media item;
      f) repeat steps b) through d) on the unidentified segment; and
      g) repeat steps e) and f) until all matching media items and commonly identified segments are identified and assigned to the new media item, and h) save the segment playlist for the new media item as a new media playlist,
wherein metadata is associated with each of the one or more segments.

2. The system of claim 1, wherein the system further comprises the one or more processors being programmed at least to:
after step g), determine that the new media item includes unidentified segments; and
assign new segment IDs to the unidentified segments.

3. The system of claim 1, wherein the system further comprises the one or more processors being programmed at least to:
if the previously identified segment of a matching media item includes signature data that is larger than the common signature data in the new media item, dividing the previously identified segment of the matching media item into a plurality of segments including a common segment and at least one new, unidentified segment not including the common signature data.

4. The system of claim 3, wherein the system further comprises the one or more processors being programmed at least to:
identify one or more media playlists that have one or more segments in common with the previously identified segment that was divided; and
update the media playlist to include the divided segments.

5. The system of claim 2, wherein the associating metadata with the system further comprises the one or more processors being programmed at least to:
augment each segment with one or more distinct context data structures, each distinct context data structure having the same duration as the segment and configured to contain temporal contextual data for the distinct context, wherein each temporal contextual data has a normalized start time and stop time within the segment; and
add distinct temporal contextual data to the distinct context data structure.

6. The system of claim 5, wherein the distinct context data structure includes at least one of a video context, an audio context, and a narrative context.

7. The system of claim 6, wherein the system further comprises the one or more processors being programmed at least to:
identify temporal contextual data that applies over a plurality of segments in a media playlist.

8. The system of claim 7, wherein the system further comprises the one or more processors being programmed at least to
identify common segments for a plurality of media items, the plurality of media items being hosted by different content systems; and
allow a user to creating a shareable link for one or more of the common segments, the link being configured to allow a plurality of users to access the media item for the one or more common segments on different content systems.

9. A computerized method comprising, in a computer system comprising one or more processors operative to execute instructions in non-transitory memory, the one or more processors programmed to, when the instructions are executed, perform the method comprising:
a) sampling a signature for a new media item;
b) comparing the signature sample of the new media item against a signature database to identify at least one segment associated with the signature in common with a matching media item;
c) retrieving a media playlist associated with the one or more previously identified segments for the matching media item from a media playlist database, each media playlist associated with one or more segments and a start time, and an end time corresponding to a each segment of a media item
d) assigning one or more segment IDs to the common segments associated with the signature in the new media item at a time location in a segment playlist for the new media item;
e) identifying a segment within the sample of the new media item;
f) repeating steps b) through d) on the unidentified segment; and
g) repeating steps e) and f) until all matching media items and commonly identified segments are identified and assigned to the new media item, and
h) saving the segment playlist for the new media item as a new media playlist,
wherein metadata from at least one metadata database is associated with each of the one or more segments.

10. The method of claim 9, wherein the method further comprises:
after step g), determining that the new media item includes unidentified segments; and
assigning new segment IDs to the unidentified segments.

11. The method of claim 9, wherein the method further comprises:
if the previously identified segment of a matching media item includes signature data that is larger than the common signature data in the new media item, dividing the previously identified segment of the matching media item into a plurality of segments including a common segment and at least one new, unidentified segment not including the common signature data.

12. The method of claim 11, wherein the method further comprises:
identifying one or more media playlists that have one or more segments in common with the previously identified segment that was divided; and
updating the media playlist to include the divided segments.

13. The method of claim 10, wherein the associating metadata with the system further comprises:
augmenting each segment with one or more distinct context data structures, each distinct context data structure having the same duration as the segment and configured to contain temporal contextual data for the distinct context, wherein each temporal contextual data has a normalized start time and stop time within the segment; and
adding distinct temporal contextual data to the distinct context data structure.

14. The method of claim 13, wherein the distinct context data structure includes at least one of a video context, an audio context, and a narrative context.

15. The method of claim 14, wherein the method further comprises:
identifying temporal contextual data that applies over a plurality of segments in a media playlist.

16. The method of claim 15, wherein the method further comprises:

identifying common segments for a plurality of media items, the plurality of media items being hosted by different content systems; and allowing a user to creating a shareable link for one or more of the common segments, the link being configured to allow a plurality of users to access the media item for the one or more common segments on different content systems.

17. A non-transitory computer readable storage device, having computer-executable instructions stored thereon, that in response to execution by a processor unit (PU) within a plurality of PUs with a network device, cause the PUs to perform operations, comprising:
   a) sampling a signature for a new media item;
   b) comparing the signature sample of the new media item against a signature database to identify at least one segment associated with the signature in common with a matching media item;
   c) retrieving a media playlist associated with the one or more previously identified segments for the matching media item from a media playlist database, each media playlist associated with one or more segments and a start time, and an end time corresponding to a each segment of a media item
   d) assigning one or more segment IDs to the common segments associated with the signature in the new media item at a time location in a segment playlist for the new media item;
   e) identifying a segment within the sample of the new media item;
   f) repeating steps b) through d) on the unidentified segment; and
   g) repeating steps e) and f) until all matching media items and commonly identified segments are identified and assigned to the new media item, and
   h) saving the segment playlist for the new media item as a new media playlist,
   wherein metadata from at least one metadata database is associated with each of the one or more segments.

18. The method of claim 17, wherein the method further comprises:
   after step g), determining that the new media item includes unidentified segments; and
   assigning new segment IDs to the unidentified segments.

19. The method of claim 18, wherein the method further comprises:
   if the previously identified segment of a matching media item includes signature data that is larger than the common signature data in the new media item, dividing the previously identified segment of the matching media item into a plurality of segments including a common segment and at least one new, unidentified segment not including the common signature data.

20. The method of claim 18, wherein the associating metadata with the system further comprises:
   augmenting each segment with one or more distinct context data structures, each distinct context data structure having the same duration as the segment and configured to contain temporal contextual data for the distinct context, wherein each temporal contextual data has a normalized start time and stop time within the segment; and
   adding distinct temporal contextual data to the distinct context data structure.

* * * * *